US011617217B2

(12) United States Patent
Teyeb et al.

(10) Patent No.: US 11,617,217 B2
(45) Date of Patent: Mar. 28, 2023

(54) TRANSPORT LAYER HANDLING FOR SPLIT RADIO NETWORK ARCHITECTURE

(71) Applicant: Telefonaktiebolaget LM Ericsson (publ), Stockholm (SE)

(72) Inventors: Oumer Teyeb, Solna (SE); Lian Araujo, Solna (SE); Matteo Fiorani, Solna (SE); Gunnar Mildh, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 19 days.

(21) Appl. No.: 17/269,579

(22) PCT Filed: Aug. 23, 2019

(86) PCT No.: PCT/IB2019/057119
§ 371 (c)(1),
(2) Date: Feb. 19, 2021

(87) PCT Pub. No.: WO2020/039400
PCT Pub. Date: Feb. 27, 2020

(65) Prior Publication Data
US 2021/0315030 A1 Oct. 7, 2021

Related U.S. Application Data

(60) Provisional application No. 62/722,167, filed on Aug. 23, 2018.

(51) Int. Cl.
*H04W 76/12* (2018.01)
*H04W 76/11* (2018.01)
*H04L 61/5076* (2022.01)

(52) U.S. Cl.
CPC ......... *H04W 76/12* (2018.02); *H04L 61/5076* (2022.05); *H04W 76/11* (2018.02)

(58) Field of Classification Search
CPC .......... H04L 12/4633; H04L 61/5076; H04W 76/11; H04W 76/12
See application file for complete search history.

(56) References Cited

U.S. PATENT DOCUMENTS

2012/0030751 A1\* 2/2012 Datta .................. H04L 63/0428
726/15
2017/0006499 A1 1/2017 Hampel et al.
(Continued)

OTHER PUBLICATIONS

3GPP, "3GPP TR 38.874 V0.4.0 (Aug. 2018)", 3rd Generation Partnership Project; Technical Specification Group Radio Access Network; Study on Integrated Access and Backhaul; (Release 15), Aug. 2018, 1-55.

(Continued)

*Primary Examiner* — Zhensheng Zhang
(74) *Attorney, Agent, or Firm* — Murphy, Bilak & Homiller, PLLC

(57) ABSTRACT

A radio network equipment central unit (20, 1700) receives a message (15) that indicates an update to a transport layer address of a radio network equipment distributed unit (10, 1600) from an old transport layer address (12A) to a new transport layer address (12B). The message (15) indicates the old transport layer address (12A) and indicates the new transport layer address (12B). The message (15) may be received from the radio network equipment distributed unit (10, 1600), or from a distributed unit of an integrated access backhaul donor. Regardless, for each of multiple user plane bearers or transport layer tunnels that are associated with the old transport layer address (12A), the radio network equipment central unit (20, 1700) may update a transport layer address of that bearer or tunnel from the old transport layer address (12A) to the new transport layer address (12B).

21 Claims, 28 Drawing Sheets

(56) References Cited

U.S. PATENT DOCUMENTS

| | | | |
|---|---|---|---|
| 2017/0265175 A1* | 9/2017 | Gandhi | H04W 76/20 |
| 2019/0053193 A1* | 2/2019 | Park | H04L 5/0091 |

OTHER PUBLICATIONS

3GPP, "3GPP TS 29.281 V15.3.0", 3rd Generation Partnership Project; Technical Specification Group Core Network and Terminals; General Packet Radio System (GPRS) Tunnelling Protocol User Plane (GTPv1-U) (Release 15), Jun. 2018, 1-32.

3GPP, "3GPP TS 36.423 V15.2.0", 3rd Generation Partnership Project; Technical Specification Group Radio Access Network; Evolved Universal Terrestrial Radio Access Network (E-UTRAN); X2 application protocol (X2AP) (Release 15), Jun. 2018, 1-389.

3GPP, "3GPP TS 38 425 V15 2.0", 3rd Generation Partnership Project; Technical Specification Group Radio Access Network; NG-RAN; NR user plane protocol (Release 15), Jun. 2018, 1-21.

Qualcomm Incorporated, et al., "IAB topology adaptation for architecture 1a", 3GPP TSG-RAN WG3 Meeting #101; R3-184693; Gothenburg, Sweden, Aug. 20-24, 2018, 1-13.

Qualcomm Incorporated, "IAB topology adaptation for architecture group 1", 3GPP TSG-RAN WG3 Meeting #AH1807; R3-183731; Montreal, Canada, Jul. 2-6, 2018, 1-8.

Information Sciences Institute, "Internet Protocol DARPA Internet Program Protocol Specification", IETF RFC 791, Information Sciences Institute, University of Southern California, Sep. 1981, 1-49.

3GPP, "3rd Generation Partnership Project; Technical Specification Group Radio Access Network; NG-RAN; F1 application protocol (F1AP) (Release 15)", 3GPP TS 38.473 V15.2.0, Jun. 2018, 1-161.

3GPP, "3rd Generation Partnership Project; Technical Specification Group Radio Access Network; NG-RAN; F1 data transport (Release 15)", 3GPP TS 38.474 V15.0.0, Jan. 2018, 1-8.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", TS 36.300 V15.2.0, Jun. 2018, 1-357.

3GPP, "3rd Generation Partnership Project; Technical Specification Group Radio Access Network; NG-RAN Architecture description (Release 15)", 3GPP TS 38.401 V15.2.0, Jun. 2018, 1-39.

3GPP, "3rd Generation Partnership Project; Technical Specification Group Radio Access Network; NG-RAN; E1 Application Protocol (E1AP) (Release 15) 3GPP TS 38.463 V15.0.0", 3GPP TS 38.463 V15.0.0, Jun. 2018, 1-132.

3GPP, "3rd Generation Partnership Project; Technical Specification Group Radio Access Network; NG-RAN; F1 application protocol (F1AP) (Release 15)", 3GPP TS 38.473 V15.2 1, Jul. 2018, 1-161.

3GPP, "3rd Generation Partnership Project; Technical Specification Group Radio Access Network; NG-RAN; F1 data transport (Release 15)", 3GPP TS 38.474 V15.1.0, Jun. 2018, 1-8.

3GPP, "3rd Generation Partnership Project; Technical Specification Group Radio Access Network; NG-RAN; F1 general aspects and principles (Release 15)", 3GPP TS 38.470 V15 2.0, Jun. 2018, 1-12.

3GPP, "3rd Generation Partnership Project; Technical Specification Group Radio Access Network; NR; NR and NG-RAN Overall Description; Stage 2 (Release 15)", 3GPP TS 38.300 V15.2 0, Jun. 2018, 1-87.

3GPP, "3rd Generation Partnership Project; Technical Specification Group Radio Access Network; NR; Radio Resource Control (RRC) protocol specification (Release 15)", 3GPP TS 38.331 V15.2.1, Jun. 2018, 1-303.

3GPP, "3rd Generation Partnership Project; Technical Specification Group Radio Access Network; Study of separation of NR Control Plane (CP) and User Plane (UP) for split option 2; (Release 15)", 3GPP TR 38.806 V15.0.0, Dec. 2017, 1-22.

3GPP, "3rd Generation Partnership Project; Technical Specification Group Radio Access Network; Study on Integrated Access and Backhaul; (Release 15) The present", 3GPP TR 38.874 V0.2.1, May 2018, 1-19.

3GPP, "3rd Generation Partnership Project; Technical Specification Group Services and System Aspects; 3GPP System Architecture Evolution (SAE); Security architecture (Release 15)", 3GPP TS 33.401 V15.4.0, Jun. 2018, 1-162.

3GPP, "3rd Generation Partnership Project; Technical Specification Group Services and System Aspects; System Architecture for the 5G System; Stage 2 (Release 15)", TS 23.501 V15.2 0, Jun. 2018, 1-217.

Deering, S., et al., "Internet Protocol, Version 6 (IPv6) Specification", Network Working Group, RFC 2460, Obsoletes: 1883, Standards Track, https://tools.ietf.org/html/rfc2460, Dec. 1998, 1-39.

Ericsson, "Protection of internal gNB interfaces", 3GPP TSG-SA WG3 Meeting #91Bis, S3-181838, La Jolla (US), May 21-25, 2018, 1-2.

Nichols, K., et al., "Definition of the Differentiated Services Field (DS Field) in the IPv4 and IPv6 Headers", IETF RFC 2474, Network Working Group, Obsoletes: 1455, 1349, Category: Standards Track Torrent Networking, Dec. 1998, 1-20.

Stewart, E., "Stream Control Transmission Protocol", Internet Engineering Task Force, Network Working Group, Request for Comments 4960, Sep. 2007, 1-152.

Tuexen, M., et al., "Datagram Transport Layer Security (DTLS) for Stream Control Transmission Protocol (SCTP)", Internet Engineering Task Force (IETF); Request for Comments: 6083; Category: Standards Track; ISSN: 2070-1721, Jan. 2011, 1-9.

3GPP, "3GPP TS 38.472 V15.1.0", 3rd Generation Partnership Project; Technical Specification Group Radio Access Network; NG-RAN; F1 signalling transport (Release 15), Jun. 2018, 1-8.

3GPP, "3rd Generation Partnership Project; Technical Specification Group Radio Access Network; Evolved Universal Terrestrial Radio Access Network (E-UTRAN); S1 Application Protocol (S1AP) (Release 15)", 3GPP TS 36.413 V15.2.0, Jun. 2018, pp. 1-378.

3GPP, "3rd Generation Partnership Project; Technical Specification Group Radio Access Network; NR; Medium Access Control (MAC) protocol specification (Release 15) The present", 3GPP TS 38.321 V15.2.0, Jun. 2018, pp. 1-73.

3Gpp, "3rd Generation Partnership Project; Technical Specification Group Radio Access Network; Study on new radio access technology: Radio access architecture and interfaces (Release 14)", 3GPP TR 38.801 V14.0.0, Mar. 2017, 91 pages.

* cited by examiner

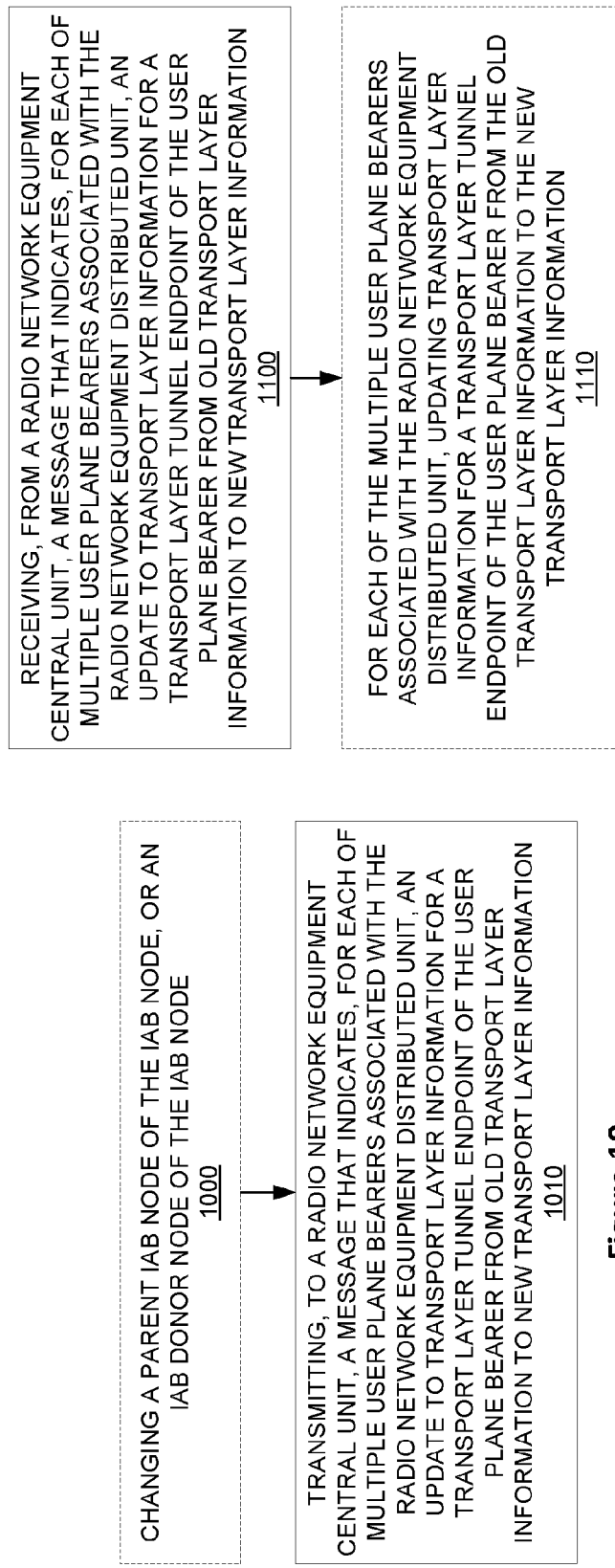

TRANSPORT LAYER HANDLING FOR SPLIT RADIO NETWORK ARCHITECTURE

RELATED APPLICATIONS

The present application claims priority to U.S. Provisional Application Ser. No. 62/722,167, filed 23 Aug. 2018, the entire contents of which is incorporated herein by reference.

TECHNICAL FIELD

The present application relates generally to a split radio network architecture, and relates more particularly to transport layer handling for such an architecture.

BACKGROUND

A split radio network architecture functionality splits a radio network node (e.g., a base station) into a so-called central unit (CU) and one or more so-called distributed units (DUs). The central unit terminates higher layer and/or less time-critical protocols, such as the Packet Data Convergence Protocol (PDCP) and Radio Resource Control (RRC) protocols towards a wireless device. The central unit also controls the operations of the distributed unit(s). A distributed unit by contrast terminates lower layer and/or more time-critical protocols, such as the Radio Link Control (RLC), Medium Access Control (MAC), and physical layer protocols.

The interface between the central unit and a distributed unit is layered horizontally into a Radio Network Layer (RNL) and a Transport Network Layer (TNL). The TNL provides a transport service for the RNL. The RNL includes application protocols and data stream protocols that are specific for the radio network and that are independent from the transport technology supporting them. The RNL is therefore concerns with application information to be carried, in the form of either user data for a user plane or control information for a control plane. The TNL includes the physical layer, the communication channels (e.g., signalling and data radio bearers), and the access link control application protocols used to set up transmission routes of the user plane. The TNL may for instance tunnel the application information between the distributed unit and the central unit via one or more transport layer tunnels, e.g., via one or more General Packet Radio Services (GPRS) Tunnelling Protocol (GTP) tunnels.

The split radio network architecture may be applied to an integrated access backhaul (IAB) where some radio resources are used for the access link to wireless devices and some radio resources are also used for the backhaul link between radio network nodes. Such IAB may be used for instance to connect small cells to the network, instead of requiring fiber connections to the many small cells. With IAB, one or more so-called IAB nodes may be chained underneath an IAB donor. Each IAB node holds a DU and a mobile termination (MT). Via the MT, the IAB node connects to an upstream IAB node or the IAB donor. Via the DU, the IAB node establishes RLC channels to user equipments (UEs) and to MTs of downstream IAB nodes. The IAB donor also holds a DU to support UEs and MTs of downstream IAB nodes. The IAB donor further holds a CU for the DUs of all IAB nodes and for its own DU.

The topology of the IAB nodes may be dynamically adapted, e.g., to account for changing channel or loading conditions on the wireless backhaul, integration of a new IAB node to the topology, or the like. IAB topology adaptation requires reconfiguring the endpoints of any transport layer tunnels associated with a migrating IAB node that hands over to a new serving IAB node. However, reconfiguring those tunnel endpoints proves challenging. Existing procedures for such reconfiguration would require one message for each transport layer tunnel or user plane bearer associated with the transport layer address to be updated. This will cause the donor CU to send a large number of messages to the migrating IAB node, which may have to propagate over several hops to reach the migrating IAB node. Doing so will not only cause inefficient air interface resource utilization over the backhaul links, but will also delay the whole handover process, thereby impacting performance and possibly causing service interruption for a multitude of UEs. Challenges exist therefore in adapting IAB topology without meaningful increases to signalling overhead.

SUMMARY

Some embodiments herein facilitate updating a transport layer address of a radio network equipment distributed unit from an old transport layer address to a new transport layer address. Such update may be facilitated using a message that indicates (e.g., includes) not only the new transport layer address but also the old transport layer address. With the old transport layer address indicated, a radio network equipment central unit that receives the message may apply the update to all transport layer tunnels or user plane bearers that are associated with that old transport layer address. That is, for each transport layer tunnel or user plane bearer that is associated with the old transport layer address, the radio network equipment central unit may update the transport layer address associated with that tunnel or bearer to the new transport layer address. In some embodiments, then, a transport layer address update for multiple transport layer tunnels or user plane bearers may be efficiently accomplished via a single message, rather than via multiple messages that include one message for each tunnel or bearer. Some embodiments may thereby enable relocating multiple transport layer tunnel endpoints associated with the radio equipment distributed unit in one "go", using a single message. These embodiments may accordingly conserve air interface resources over backhaul links, as well as preserving service performance and continuity.

More particularly, embodiments herein include a method performed by radio network equipment. The method comprises transmitting, to a radio network equipment central unit, a message that indicates an update to a transport layer address of a radio network equipment distributed unit from an old transport layer address to a new transport layer address. The message may indicate the old transport layer address and indicate the new transport layer address.

In some embodiments, multiple user plane bearers or transport layer tunnels are each associated with the old transport layer address. In this case, a transport layer address associated with each of the multiple user plane bearers or transport layer tunnels is to be updated from the old transport layer address to the new transport layer address.

In some embodiments, the message indicates that, for each of multiple user plane bearers associated with the radio network equipment distributed unit, a transport layer address of a transport layer tunnel endpoint of the user plane bearer is to be changed from the old transport layer address to the new transport layer address. For example, the message may indicate, for each of the multiple user plane bearers associated with the radio network equipment distributed unit, an update to transport layer information for the transport layer tunnel endpoint of the user plane bearer from old transport layer information to new transport layer information. In this case, the old transport layer information includes the old transport layer address and the new transport layer information includes the new transport layer address. In some embodiments, the old transport layer information further includes an old tunnel endpoint identity, TEID, and the new transport layer information further includes a new TEID. In any of these embodiments, a transport layer tunnel endpoint may be an endpoint of an F1-U tunnel or a GTP-U tunnel between the radio network equipment distributed unit and the radio network equipment central unit. In any of these embodiments, at least some of the multiple user plane bearers may be associated with different wireless devices.

In some embodiments, the message is a F1 application part, AP, protocol message.

In some embodiments, the radio network equipment distributed unit is a distributed unit of the radio network equipment.

In some embodiments, the radio network equipment distributed unit is a distributed unit of an integrated access backhaul, IAB, node, and the radio network equipment central unit is a central unit of an IAB donor that is a donor for the IAB node. In one such embodiment, the method further comprises changing a parent IAB node of the IAB node, or an IAB donor of the IAB node. In this case, the transmitting of the message may be performed responsive to or as part of a procedure for said changing.

In other embodiments, the radio network equipment distributed unit is a distributed unit of the radio network equipment and the radio network equipment central unit is a central unit of the same radio network equipment. In this case, the message may be transmitted by the radio network equipment distributed unit. In one embodiment, the distributed unit comprises multiple logical units to which different transport layer addresses are allocable, and the method further comprises switching one or more of the logical units on or off. Accordingly, the transmitting of the message may be performed responsive to said switching.

In still other embodiments, the radio network equipment distributed unit is a distributed unit of an integrated access backhaul, IAB, node, the radio network equipment central unit is a central unit of an IAB donor that is a donor for the IAB node, and the radio network equipment that performs the method is a distributed unit of the IAB donor.

In some embodiments, the method further comprises changing the transport layer address of the radio network equipment distributed unit, and the transmitting of the message is performed responsive to said changing.

Embodiments herein also include a method performed by a radio network equipment central unit. The method comprises receiving a message that indicates an update to a transport layer address of a radio network equipment distributed unit from an old transport layer address to a new transport layer address. The message may indicate the old transport layer address and indicate the new transport layer address.

In some embodiments, the method further comprises changing a transport layer address of a transport layer tunnel endpoint of a user plane bearer associated with the radio network equipment distributed unit from the old transport layer address to the new transport layer address.

In some embodiments, wherein multiple user plane bearers or transport layer tunnels are each associated with the old transport layer address. In this case, the method may further comprise, for each of the multiple user plane bearers or transport layer tunnels, updating a transport layer address associated with the user plane bearer or transport layer tunnel from the old transport layer address to the new transport layer address.

In some embodiments, the message indicates, for each of multiple user plane bearers associated with the radio network equipment distributed unit, an update to transport layer information for a transport layer tunnel endpoint of the user plane bearer from old transport layer information to new transport layer information. In one such embodiment, the old transport layer information includes the old transport layer address and the new transport layer information includes the new transport layer address. In some embodiments, the old transport layer information further includes an old tunnel endpoint identity, TEID, and the new transport layer information further includes a new TEID.

In some embodiments, a transport layer tunnel endpoint is an endpoint of an F1-U tunnel, or a GTP-U tunnel, between the radio network equipment distributed unit and the radio network equipment central unit.

In any of these embodiments, at least some of the multiple user plane bearers may be associated with different wireless devices.

In some embodiments, the message is received from the radio network equipment distributed unit.

In some embodiments, the radio network equipment distributed unit is a distributed unit of an integrated access backhaul, IAB, node, and the radio network equipment central unit is a central unit of an IAB donor that is a donor for the IAB node. In one such embodiment, the receiving of the message is performed responsive to, or as part of a procedure for, a change in a parent IAB node of the IAB node or an IAB donor of the IAB node.

In some embodiments, the radio network equipment distributed unit is a distributed unit of radio network equipment and the radio network equipment central unit is a central unit of the same radio network equipment. In one such embodiment, the distributed unit comprises multiple logical units to which different transport layer addresses are allocable. In this case, receiving of the message is performed responsive to, or as part of a procedure for, switching one or more of the logical units on or off.

In some embodiments, the radio network equipment distributed unit is a distributed unit of an integrated access backhaul, IAB, node, the radio network equipment central unit is a central unit of an IAB donor that is a donor for the IAB node, and the message is received from a distributed unit of the IAB donor.

In some embodiments, the message is a F1 application part, AP, protocol message.

Embodiments herein further include a method performed by a radio network equipment central unit. The method comprises assigning a new transport layer address to a radio network equipment distributed unit. The method also comprises, responsive to said assigning, for each of multiple user plane bearers associated with the radio network equipment distributed unit, changing a transport layer address of a transport layer tunnel endpoint of the user plane bearer to the new transport layer address.

In some embodiments, the radio network equipment distributed unit is a distributed unit of an integrated access backhaul, IAB, node, and the radio network equipment central unit is a central unit of an IAB donor node. In one such embodiment, said assigning is performed responsive to, or as part of a procedure for, a change in a parent IAB node of the IAB node or an IAB donor node of the IAB node.

In some embodiments, the radio network equipment distributed unit is a distributed unit of radio network equipment and the radio network equipment central unit is a central unit of the same radio network equipment.

Embodiments herein also include corresponding apparatus, computer programs, and carriers. For example, embodiments herein include radio network equipment configured (e.g., via communication circuitry and processing circuitry) to transmit, to a radio network equipment central unit, a message that indicates an update to a transport layer address of a radio network equipment distributed unit from an old transport layer address to a new transport layer address. The message may indicate the old transport layer address and indicate the new transport layer address.

Embodiments herein also include a radio network equipment central unit configured (e.g., via communication circuitry and processing circuitry) to receive a message that indicates an update to a transport layer address of a radio network equipment distributed unit from an old transport layer address to a new transport layer address. In some embodiments, the radio network equipment central unit is also configured to change a transport layer address of a transport layer tunnel endpoint of a user plane bearer associated with the radio network equipment distributed unit from the old transport layer address to the new transport layer address. The message may indicate the old transport layer address and indicate the new transport layer address.

Embodiments further include a radio network equipment central unit configured (e.g., via communication circuitry and processing circuitry) to assign a new transport layer address to a radio network equipment distributed unit. The radio network equipment central unit may also be configured to, responsive to said assigning, for each of multiple user plane bearers associated with the radio network equipment distributed unit, change a transport layer address of a transport layer tunnel endpoint of the user plane bearer to the new transport layer address.

BRIEF DESCRIPTION OF THE DRAWINGS

FIG. 7A is a logic flow diagram of a method performed by radio network equipment according to some embodiments.

FIG. 7B is a logic flow diagram of a method performed by a radio network equipment central unit according to some embodiments.

FIG. 8 is a logic flow diagram of a method performed by a radio network equipment distributed unit according to some embodiments.

FIG. 9 is a logic flow diagram of a method performed by a radio network equipment central unit according to some embodiments.

FIG. 10 is a logic flow diagram of a method performed by a radio network equipment distributed unit according to other embodiments.

FIG. 11 is a logic flow diagram of a method performed by a radio network equipment central unit according to other embodiments.

FIG. 12 is a logic flow diagram of a method performed by a distributed unit of an TAB donor according to some embodiments.

FIG. 13 is a logic flow diagram of a method performed by a central unit of an TAB donor according to some embodiments.

DETAILED DESCRIPTION

Figure 1:
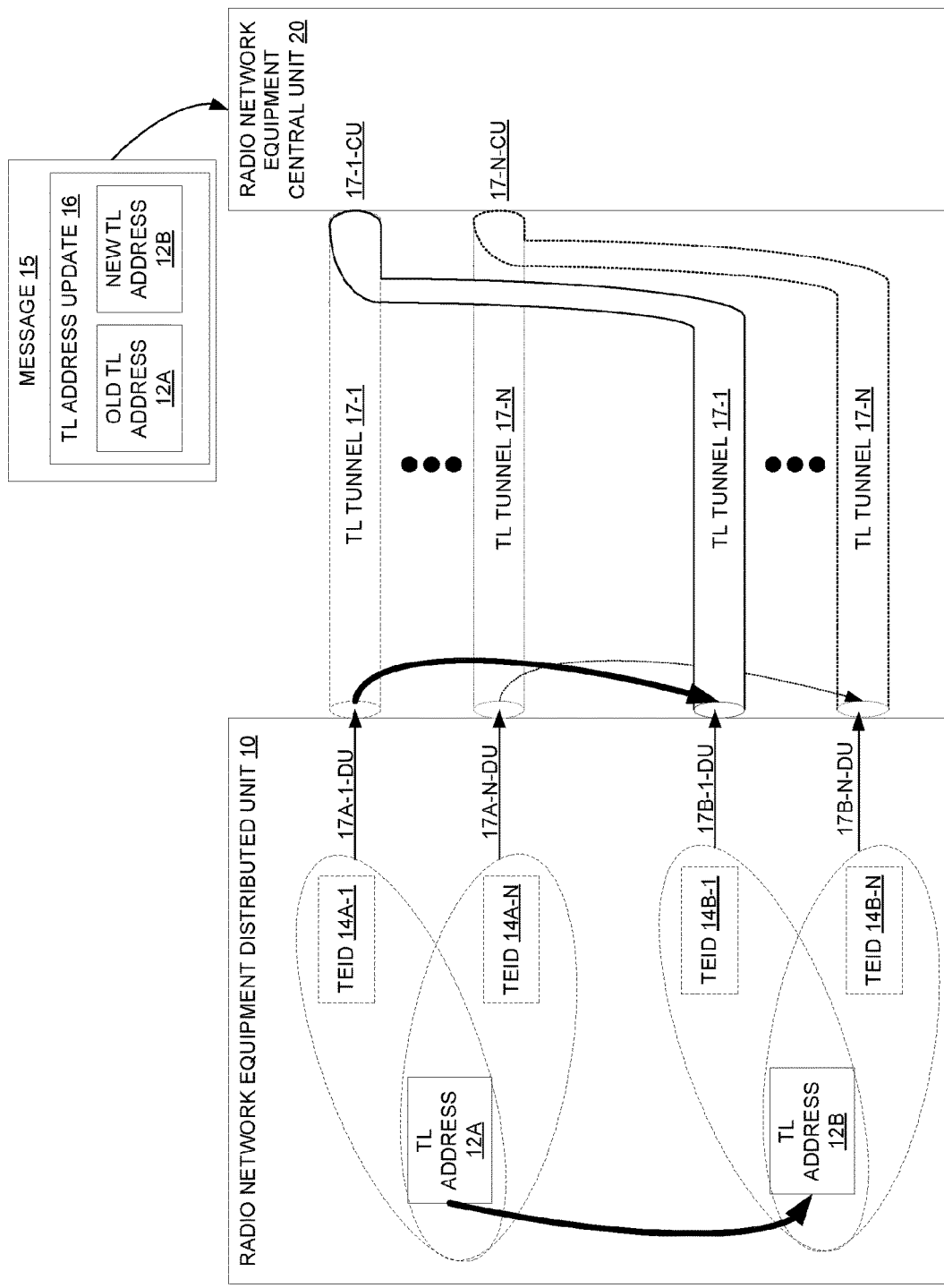
FIG. 1 is a block diagram of a radio network equipment distributed unit and a radio network equipment central unit according to some embodiments.

FIG. 1 shows a radio network equipment distributed unit 10 and a radio network equipment central unit 20 in a wireless communication system according to some embodiments. The radio network equipment distributed unit 10 is radio network equipment that is, implements, or hosts a distributed unit (DU). Such a distributed unit terminates lower layer and/or more time-critical protocols, such as the Radio Link Control (RLC), Medium Access Control (MAC), and physical layer protocols. The radio network equipment central unit 20 is radio network equipment that is, implements, or hosts a central unit (CU). Such a central unit terminates higher layer and/or less time-critical protocols, such as the Packet Data Convergence Protocol (PDCP) and Radio Resource Control (RRC) protocols.

The interface between the radio network equipment distributed unit 10 and the radio network equipment central unit 20 is layered horizontally into a Radio Network Layer (RNL) and a Transport Network Layer (TNL). The TNL may also be referred to generally as a transport layer (TL). As shown in FIG. 1, the radio network equipment distributed unit 10 has a TL address 12A (e.g., an Internet Protocol, IP, address) at which the radio network equipment distributed unit 10 is reachable at the transport layer. The TL address 12A may for instance be an address needed by the radio network equipment central unit 20 for directing communication (e.g., in a downlink direction) to the radio network equipment distributed unit 10.

In some embodiments, though, the TL address 12A of the radio network equipment distributed unit 10 may change, e.g., to a new TL address 12B. Such change of the TL address 12A may impact the ability of the radio network equipment central unit 20 to communicate with the radio network equipment distributed unit 10, e.g., in the downlink direction. According to some embodiments, then, a message 15 is transmitted to the radio network equipment central unit 20. The message 15 may for instance be an F1 application part (F1-AP) protocol message, such as a gNB-DU configuration update message. Regardless, the message 15 indicates an update 16 to the TL address 12A of the radio network equipment distributed unit 10 from an old TL address 12A to a new TL address 12B. The message 15 in some embodiments notably indicates (e.g., includes) not only the new TL address 12B but also the old TL address 12A. That is, the message 15 indicates which TL address is to be updated with the new TL address 12B by actually indicating that TL address as an old TL address 12A. Upon receiving the message 15, the radio network equipment central unit 20 may correspondingly also change the TL address 12A of the radio network equipment distributed unit 10, e.g., from the old TL address 12A to the new TL address 12B. That is, the radio network equipment central unit 20 may apply the address change (i.e., the update 16) locally. This way, the radio network equipment central unit 20 will use the new TL address 12B for communicating with the radio network equipment distributed unit 10.

FIG. 1 more particularly shows that some embodiments are applicable in a context where the radio network equipment distributed unit 10 and the radio network equipment central unit 20 communicate using transport layer (TL) tunnelling. As shown in this context, a TL tunnel 17-1 is established between the radio network equipment distributed unit 10 and the radio network equipment central unit 20. The TL tunnel 17-1 may for instance be an F1-U tunnel or a General Packet Radio Service (GPRS) Tunneling Protocol (GTP) User plane (GTP-U) tunnel, e.g., where the term F1-U tunnel may refer to a GTP-U tunnel on an F1 interface. In some embodiments, the TL tunnel 17-1 is a tunnel for a user plane bearer (not shown) associated with the radio network equipment distributed unit 10. Regardless, one endpoint 17A-1-DU of the TL tunnel 17-1 (i.e., the distributed unit, DU, side) may be at least partly defined by or otherwise associated with the TL address 12A. In this case, then, the change of the TL address 12A may effectively amount to a change of the DU-side endpoint 17A-1-DU of the TL tunnel 17-1, i.e., from DU-side endpoint 17A-1-DU to DU-side endpoint 17B-1-DU. This change of the DU-side endpoint 17A-1-DU of the TL tunnel 17-1 may be accompanied by a change of the central unit, CU, side endpoint 17-1-CU of the TL tunnel 17-1 as well. Or, as shown in FIG. 1, the CU-side endpoint 17-1-CU of the TL tunnel 17-1 may remain unchanged.

In any event, in a tunnelling context, the message 15 transmitted to the radio network equipment central unit 20 may indicate that the TL address 12A of the TL tunnel endpoint 17A-1-DU (e.g., of a user plane bearer) is to be changed from the old TL address 12A to the new TL address 12B. In some embodiments in this regard, the message 15 may indicate that, for each of multiple user plane bearers associated with the radio network equipment distributed unit 10, the TL address 12A of the TL tunnel endpoint 17A-1-DU of the user plane bearer is to be changed from the old TL address 12A to the new TL address 12B.

Note that in some embodiments, though, multiple TL tunnels or user plane bearers may be associated with the same old TL address 12A. This may be the case for instance where a DU-side tunnel endpoint is only partly defined by or otherwise associated with a TL address. Indeed, as shown in FIG. 1, the DU-side tunnel endpoint 17A-1-DU may be defined by or otherwise associated with a combination of the TL address 12A and a so-called tunnel endpoint identity (TEID) 14A-1. Moreover, another DU-side tunnel endpoint 17A-N-DU may be established as the DU-side endpoint of another TL tunnel 17-N. This DU-side tunnel endpoint 17A-N-DU is defined by or otherwise associated with a combination of the same TL address 12A but a different TEID 14A-N. The different TEIDs therefore separate the DU-side endpoints of the TL tunnels 17-1 . . . 17-N that use the same TL address 12A.

In these and other embodiments, then, the indication of the old TL address 12A in the message 15 may advantageously enable the radio network equipment central unit 20 to apply the update 16 to multiple TL tunnels 17-1, . . . 17-N or user plane bearers that are associated with that old TL address 12A. That is, for each TL tunnel 17-1 . . . 17-N or user plane bearer that is associated with the old TL address 12A, the radio network equipment central unit 20 may update the TL address associated with that tunnel or bearer to the new TL address 12B. As shown in FIG. 1, for example, since each TL tunnel 17-1 . . . 17-N is associated with the old TL address 12A, the radio network equipment central unit 20 updates the TL address associated with that tunnel or bearer to the new TL address 12B. This may effectively relocate the DU-side endpoint 17A-1-DU of tunnel 17-1 to DU-side endpoint 17B-1-DU, and relocate the DU-side endpoint 17A-N-DU of tunnel 17-N to DU-side endpoint 17B-N-Du.

In some embodiments, then, a TL address update for multiple TL tunnels 17-1 . . . 17-N or user plane bearers may be efficiently accomplished via a single message 15. Some embodiments may thereby enable relocating multiple TL tunnel endpoints associated with the radio equipment distributed unit 10 in one "go", using a single message. Exploiting the old TL address 12A common to multiple tunnels or bearers in this way proves more efficient than accomplishing such relocation via multiple messages, with each message identifying a specific TL tunnel or user plane bearer as well as the new TL address to be associated with that tunnel or bearer. These embodiments may accordingly conserve air interface resources over backhaul links, as well as preserving service performance and continuity.

Note that a change of A DU-side tunnel endpoint in some embodiments as shown may be attributable to a change in a TL address 12A-1, with or without a change in a TEID. FIG. 1 for instance shows that the TL address 12A may be changed to the new TL address 12B, in combination with a change in the TEIDs 14A-1 and 14A-N to new TEIDs 14B-1 and 14B-N. In some embodiments, then, the message 15 may more generally indicate an update to TL information for the TL tunnel endpoint 17A-1-DU (e.g., of a user plane bearer) from old TL information to new TL information. The old TL information in this case may include the old TL address 12A and/or the old TEID 14A-1, whereas the new TL information may include the new TL address 12B and/or the new TEID 14B-1.

Figure 2:
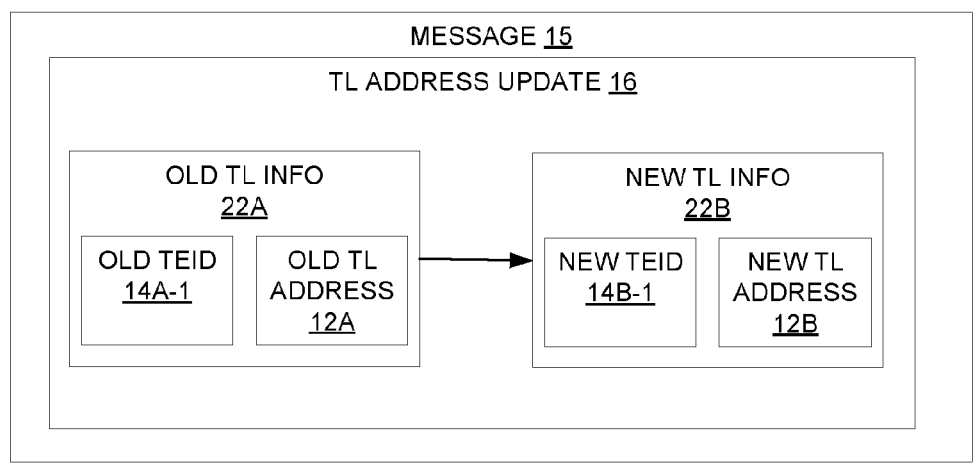
FIG. 2 is a block diagram of a message with a transport layer address update according to some embodiments.

FIG. 2 shows one example of such a message 15. As shown in FIG. 2B, the message 15 indicates an update to TL information 22A for a TL tunnel endpoint 17A-1-DU from old TL information 22A to new TL information 22B. In some embodiments, the message 15 may more particularly indicate, for each of one or more user plane bearers associated with the radio network equipment distributed unit 10, an update to TL information for the transport layer tunnel endpoint of the user plane bearer from old TL information to new TL information.

Figure 3:
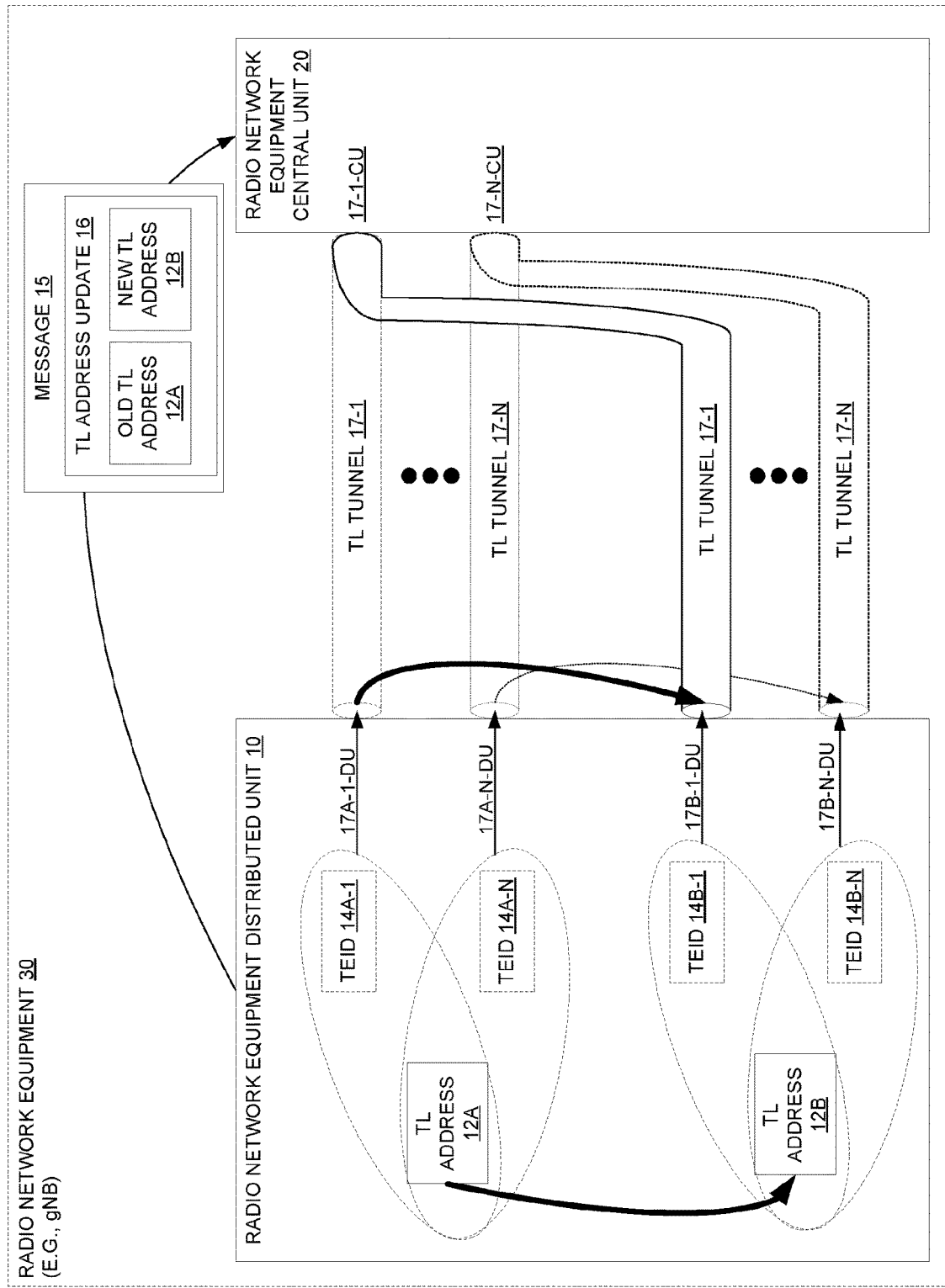
FIG. 3 is a block diagram of radio network equipment with a radio network equipment distributed unit and a radio network equipment central unit according to some embodiments.

In any event, the radio network equipment distributed unit 10 in some embodiments as shown in FIG. 3 is a distributed unit of radio network equipment 30, e.g., a base station such as a gNB in a 5G radio network. And the radio network equipment central unit 20 is a central unit of the same radio network equipment 30. In this case, the radio network equipment distributed unit 10 may be the entity that transmits the message 15 to the radio network equipment central unit 20, as shown in FIG. 3. In some embodiments, for example, the distributed unit of the radio network equipment 30 comprises multiple logical units to which different TL addresses are allocable. The message 15 in such a case may be transmitted responsive to switching one or more of the logical units on or off, e.g., for power saving, loading balancing, maintenance, or the like.

Figure 4:
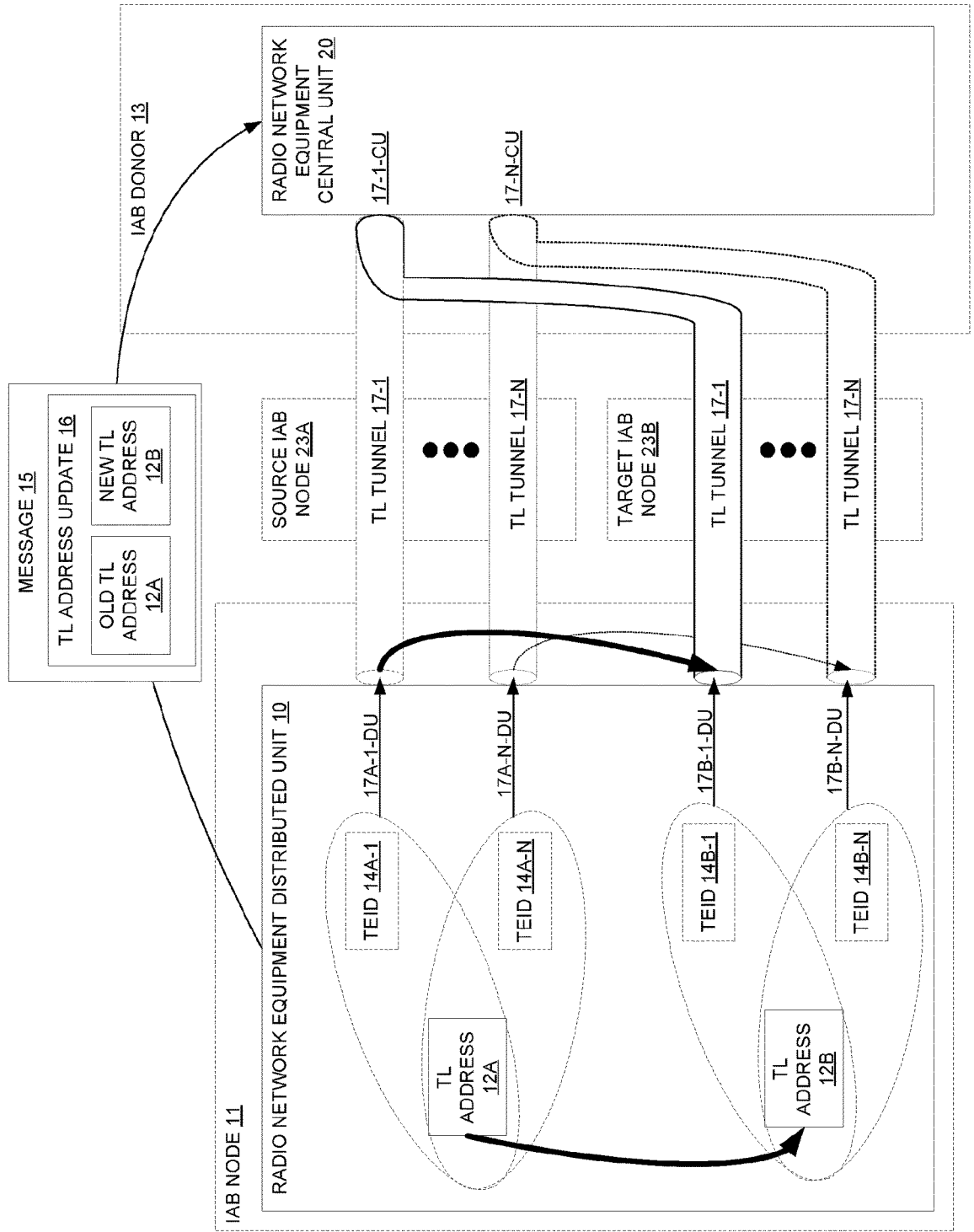
FIG. 4 is a block diagram of an integrated access backhaul (IAB) node with a radio network equipment distributed unit, and an TAB donor with a radio network equipment central unit, according to some embodiments.

In other embodiments, the radio network equipment distributed unit 10 is a distributed unit of different radio network equipment than the radio network equipment for which the radio network equipment central unit 20 is a central unit. FIG. 4 shows one example in the context of integrated access backhaul (IAB). As shown in this example, the radio network equipment distributed unit 10 is a distributed unit of an IAB node 11, and the radio network equipment central unit 20 is a central unit of an IAB donor 13 that is a donor for the IAB node 11. In this case, the IAB node 11 may also implement a mobile termination (MT) (not shown) via which the IAB node 11 connects to a "parent" IAB node. The parent IAB node may be the IAB donor 13 itself, or may be an intermediate IAB node.

The parent IAB node and/or the IAB donor of the IAB node 11 proves meaningful especially in cases where a change of the parent IAB node or the IAB donor causes or is associated with a change in the TL address(es) of the radio network equipment distributed unit 10. For example, in some embodiments, the parent IAB node, the IAB donor DU, or the IAB donor CU may be the entity that allocates or assigns the TL address(es) of the radio network equipment distributed unit 10. In these and other embodiments, then, a change in the parent IAB node, the IAB donor DU, or the IAB donor CU means that a new parent IAB node, a new IAB donor DU, or a new IAB donor CU allocates new TL address(es) to the radio network equipment distributed unit 10. Accordingly, in some embodiments, the radio network equipment distributed unit 10 may change its parent IAB node or its IAB donor, and transmit the message 15 responsive to or as part of a procedure for such change. FIG. 4 shows one example.

As shown in FIG. 4, the IAB node 11 changes its parent IAB node from a source IAB node 23A to a target IAB node 24A. This may or may not be accompanied by a change in the IAB donor DU from a source IAB donor to a target IAB donor (not shown). Regardless, especially if the node (e.g., IAB parent node or IAB donor DU) that allocates the TL address(es) of the radio network equipment distributed unit 10 changes, such a change causes or is associated with a change in the TL address(es) themselves. In some embodiments, then, the radio network equipment distributed unit 10 transmits the message 15 to the radio network equipment central unit 20 as shown, to indicate an update to the TL address(es).

Figure 5:
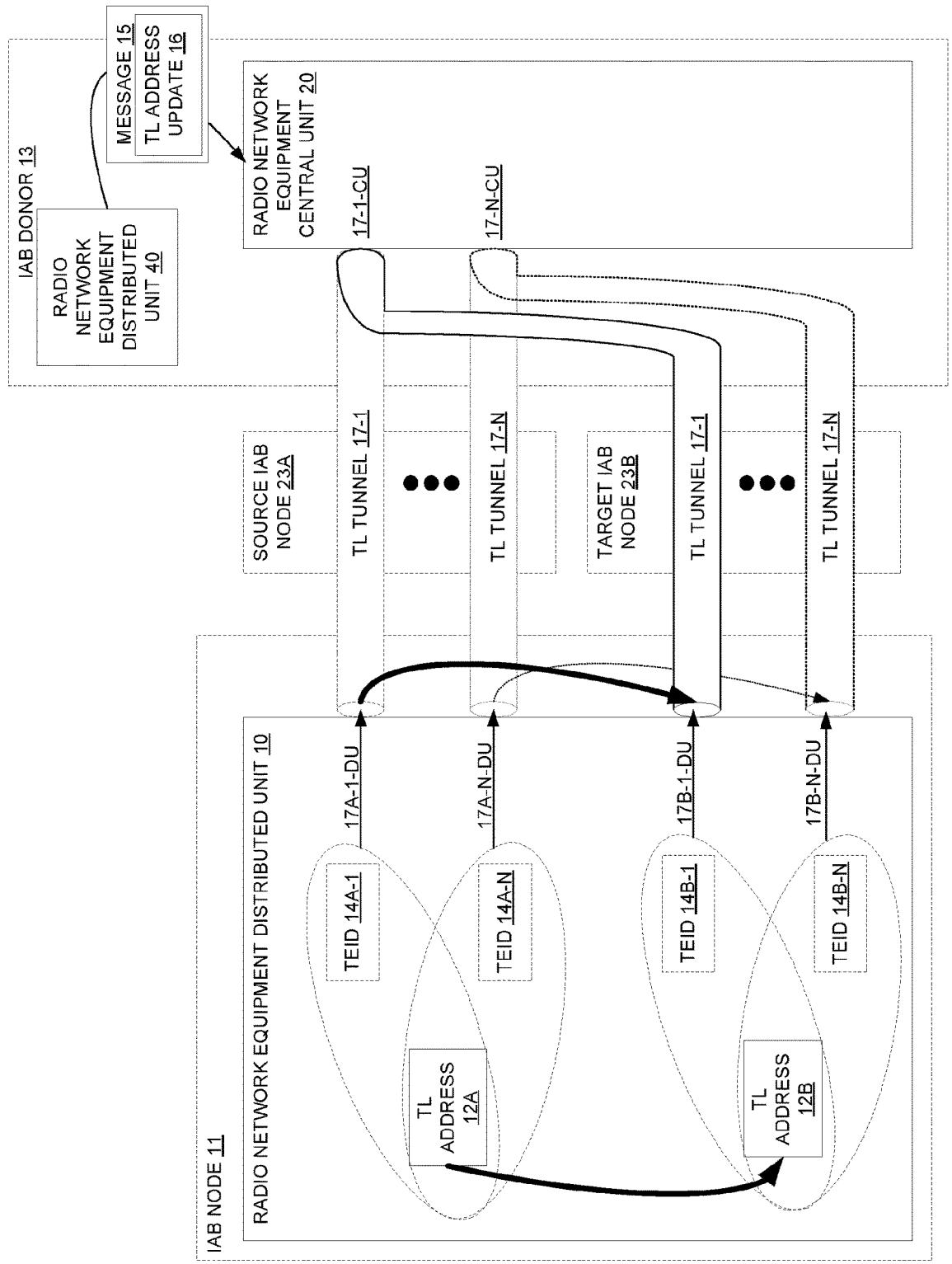
FIG. 5 is a block diagram of an TAB donor with a radio network equipment distributed unit and a radio network equipment central unit according to some embodiments.

In other embodiments shown in FIG. 5, it is a radio network equipment distributed unit 40 of the IAB donor 13 that transmits the message 15 to the radio network equipment central unit 20. This may be the case for instance if it is the radio network equipment distributed unit 40 of the IAB donor 13 that allocates the TL address(es) to the radio network equipment distributed unit 20.

Figure 6:
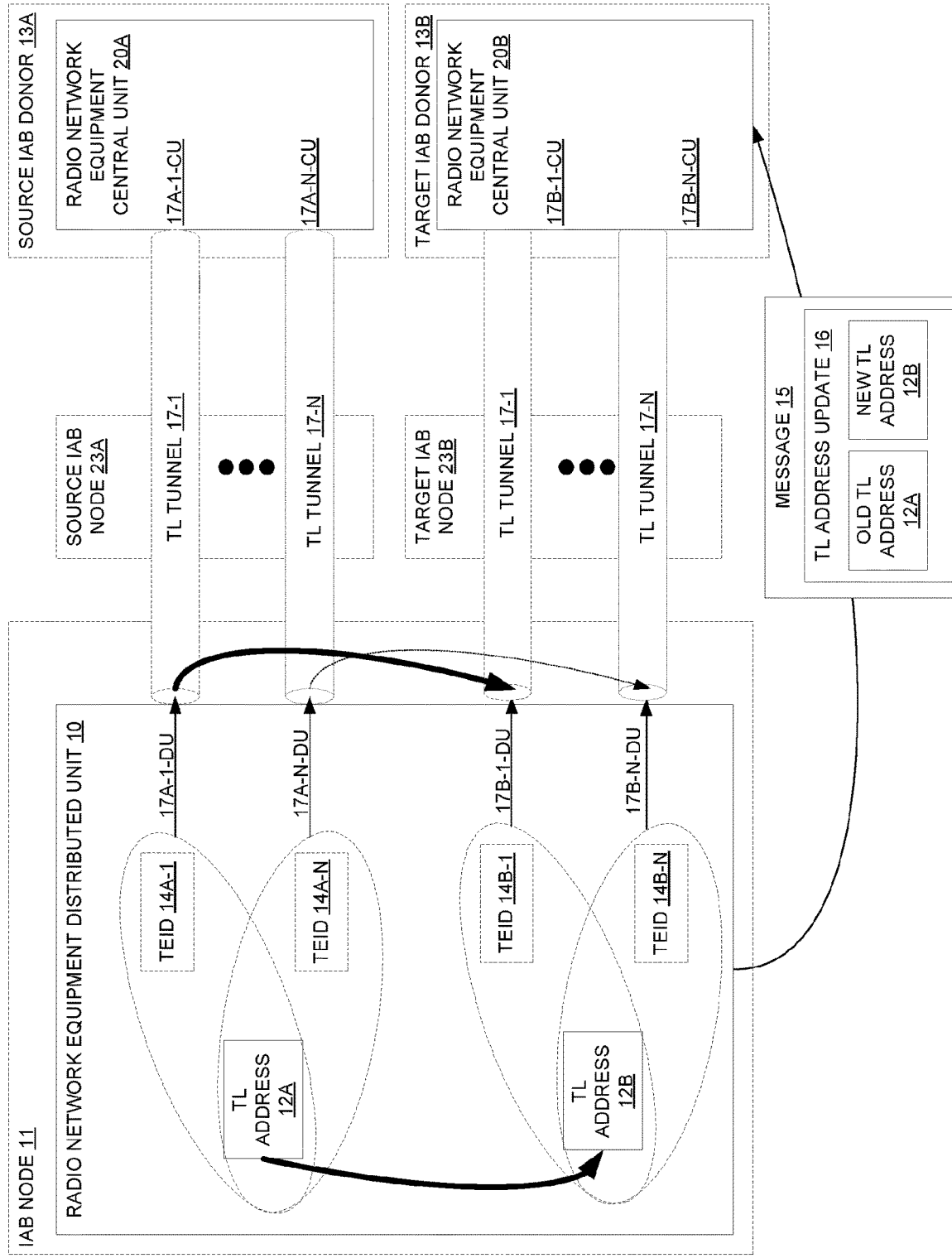
FIG. 6 is a block diagram of an TAB node with a radio network equipment distributed unit, and a target TAB donor with a radio network equipment central unit, according to some embodiments.

In still other embodiments shown in FIG. 6, a change in the parent IAB node of IAB node 11 causes or is accompanied by a change in the IAB donor from a source IAB donor 13A to a target IAB donor 13B. This means that the CU-side endpoints of the TL tunnels 17-1 . . . 17-N are updated from endpoints 17A-1-CU . . . 17A-N-CU at a radio network equipment central unit 20A of the source IAB donor 13A to endpoints 17B-1-CU . . . 17B-N-CU at a radio network equipment central unit 20B of the target IAB donor 13B. The source IAB donor 13A may transmit information about the tunnels 17-1 . . . 17-N and associated user plane bearers to the target IAB donor 13B. In some embodiments, as shown in FIG. 6, the radio network equipment distributed unit 10 transmits the message 15 (indicating the update 16 to the TL address 12A of the radio network equipment distributed unit 10) to the radio network equipment central unit 20B of the target IAB donor 13B. The radio network equipment central unit 20B can then update the TL address 12A according to the message 15. In these embodiments, then, the radio network equipment central unit 20B of the target IAB donor 13B operates as the radio network equipment central unit 20 described above.

In other embodiments not shown, though, the radio network equipment distributed unit 10 transmits the message 15 (indicating the update 16 to the TL address 12A of the radio network equipment distributed unit 10) to the radio network equipment central unit 20A of the source IAB donor 13A. The radio network equipment central unit 20A of the source IAB donor 13A may then forward the message 15 to the radio network equipment central unit 20B of the target IAB donor.

Note that embodiments above have been described from the perspective of a radio network equipment central unit 20 as a whole. In some embodiments, though, the radio network equipment central unit 20 may be functionally or logically separated into a central unit for the control plane (CU-CP) and a central unit for the user plane (CU-UP). In this case, the radio network equipment distributed unit 10 may transmit the message 15 to the central unit for the control plane (CU-CP). The TL tunnels 17-1 . . . 17-N would nonetheless terminate at the central unit for the user plane (CU-UP).

In view of the above modifications and variations, FIG. 7A depicts a method performed by radio network equipment in accordance with particular embodiments. The method includes transmitting, to a radio network equipment central unit 20, a message 15 that indicates an update 16 to a transport layer address of a radio network equipment distributed unit 10 from an old transport layer address 12A to a new transport layer address 12B (Block 710). In some embodiments, the message 15 indicates the old transport layer address 12A and indicates the new transport layer address 12B.

In some embodiments, multiple user plane bearers or transport layer tunnels 17-1 . . . 17-N are each associated with the old transport layer address 12A. In this case, a transport layer address associated with each of the multiple user plane bearers or transport layer tunnels 17-1 . . . 17-N is to be updated from the old transport layer address 12A to the new transport layer address 12B.

In some embodiments, the message 15 indicates that, for each of multiple user plane bearers associated with the radio network equipment distributed unit 10, a transport layer address of a transport layer tunnel endpoint 17A-1-DU of the user plane bearer is to be changed from the old transport layer address 12A to the new transport layer address 12B. For example, the message 15 may indicate, for each of the multiple user plane bearers associated with the radio network equipment distributed unit 10, an update to transport layer information for the transport layer tunnel endpoint 17A-1-DU of the user plane bearer from old transport layer information 22A to new transport layer information 22B. The message 15 may include the old transport layer information 22A and include the new transport layer information 22B. The old transport layer information 22A may include the old transport layer address 12A and the new transport layer information 22B may include the new transport layer address 12B. In some embodiments, the old transport layer information further includes an old tunnel endpoint identity, TEID, 14A-1 and the new transport layer information further includes a new TEID 14B-1. In any of these embodiments, a transport layer tunnel endpoint may be an endpoint of a tunnel 17-1 (e.g., an F1-U tunnel or a GTP-U tunnel). Alternatively or additionally, in any of these embodiments, at least some of the multiple user plane bearers may be associated with different wireless devices.

In some embodiments, the message 15 is a F1 application part, AP, protocol message.

In some embodiments, the radio network equipment distributed unit 10 is a distributed unit of the radio network equipment.

In some embodiments, the radio network equipment distributed unit 10 is a distributed unit of an integrated access backhaul, IAB, node 11, and the radio network equipment central unit is a central unit of an IAB donor 13 that is a donor for the IAB node 11. In one such embodiment, the method further comprises changing a parent IAB node of the IAB node 11, or an IAB donor 13 of the IAB node 11 (Block 700). In this case, the transmitting of the message 15 may be performed responsive to or as part of a procedure for said changing.

In other embodiments, the radio network equipment distributed unit 10 is a distributed unit of the radio network equipment and the radio network equipment central unit is a central unit of the same radio network equipment. In this case, the radio network equipment may be the radio network equipment 30 shown in FIG. 3. In this case, the message 15 may be transmitted by the radio network equipment distributed unit 10. In one embodiment, the distributed unit comprises multiple logical units to which different transport layer addresses are allocable, and the method further comprises switching one or more of the logical units on or off. Accordingly, the transmitting of the message 15 may be performed responsive to said switching.

In still other embodiments, the radio network equipment distributed unit 10 is a distributed unit of an integrated access backhaul, IAB, node 11, the radio network equipment central unit 20 is a central unit of an IAB donor 13 that is a donor for the IAB node 11, and the radio network equipment that performs the method is a distributed unit 40 of the IAB donor 13.

In some embodiments, the method further comprises changing the transport layer address of the radio network equipment distributed unit 10, and the transmitting of the message 15 is performed responsive to said changing.

FIG. 7B depicts a corresponding method performed by a radio network equipment central unit 20 in accordance with other particular embodiments. The method includes receiving (e.g., from a radio network equipment distributed unit 10 or 40) a message 15 that indicates an update 16 to a transport layer address 12A-1 of a radio network equipment distributed unit 10 from an old transport layer address 12A to a new transport layer address 12B (Block 720). In some embodiments, the message 15 indicates the old transport layer address 12A and indicates the new transport layer address 12B.

In some embodiments, the method may further include changing a transport layer address of a transport layer tunnel endpoint of a user plane bearer associated with the radio network equipment distributed unit 10 from the old transport layer address 12A to the new transport layer address 12B.

In some embodiments, multiple user plane bearers or transport layer tunnels 17-1 . . . 17-N are each associated with the old transport layer address 12A. In this case, the method may further comprise, for each of the multiple user plane bearers or transport layer tunnels 17-1 . . . 17-N, updating a transport layer address associated with the user plane bearer or transport layer tunnel from the old transport layer address 12A to the new transport layer address 12B.

In some embodiments, the method may include, for each of multiple user plane bearers associated with the radio network equipment distributed unit 10, updating a transport layer tunnel endpoint of the user plane bearer based on the received message 15 (Block 730). For example, in one embodiment, updating a transport layer tunnel endpoint of the user plane bearer based on the received message 15 comprises changing a transport layer address of the transport layer tunnel endpoint 17-1-DU from the old transport layer address 12A to the new transport layer address 12B.

In some embodiments, the message 15 indicates that, for each of multiple user plane bearers associated with the radio network equipment distributed unit 10, a transport layer address of a transport layer tunnel endpoint 17-1-DU of the user plane bearer is to be changed from the old transport layer address 12A to the new transport layer address 12B. For example, the message 15 may indicate, for each of the multiple user plane bearers associated with the radio network equipment distributed unit 10, an update to transport layer information for the transport layer tunnel endpoint 17-1-DU of the user plane bearer from old transport layer information 22A to new transport layer information 22B. In this case, the old transport layer information includes the old transport layer address 12A and the new transport layer information includes the new transport layer address 12B. In some embodiments, the old transport layer information further includes an old tunnel endpoint identity, TEID, 14A-1 and the new transport layer information further includes a new TEID 14B-1. In any of these embodiments, a transport layer tunnel endpoint may be an endpoint of a tunnel 17-1 (e.g., an F1-U tunnel or a GTP-U tunnel) between the radio network equipment distributed unit 10 and the radio network equipment central unit 20. Alternatively or additionally, in any of these embodiments, at least some of the multiple user plane bearers may be associated with different wireless devices.

In some embodiments, the message 15 is received from the radio network equipment distributed unit 10.

In some embodiments, the radio network equipment distributed unit 10 is a distributed unit of an integrated access backhaul, IAB, node 11, and the radio network equipment central unit 20 is a central unit of an IAB donor 13 that is a donor for the IAB node 11. In one such embodiment, the receiving of the message 15 is performed responsive to, or as part of a procedure for, a change in a parent IAB node of the IAB node or an IAB donor of the IAB node 11.

In some embodiments, the radio network equipment distributed unit 10 is a distributed unit of radio network equipment 30 and the radio network equipment central unit 20 is a central unit of the same radio network equipment 30. In one such embodiment, the distributed unit comprises multiple logical units to which different transport layer addresses are allocable. In this case, receiving of the message is performed responsive to, or as part of a procedure for, switching one or more of the logical units on or off.

In some embodiments, the radio network equipment distributed unit 10 is a distributed unit of an integrated access backhaul, IAB, node 11, the radio network equipment central unit 20 is a central unit of an IAB donor 13 that is a donor for the IAB node 11, and the message is received from a distributed unit of the IAB donor 13.

In some embodiments, the message 15 is a F1 application part, AP, protocol message.

FIG. 8 more particularly depicts a method performed by the radio network equipment distributed unit 10 in accordance with some embodiments. The method includes transmitting, to a radio network equipment central unit 20, a message 15 that indicates an update 16 to a transport layer address of the radio network equipment distributed unit 10 from an old transport layer address 12A to a new transport layer address 12B (Block 810).

In some embodiments, the message 15 also indicates an update to one or more other transport layer addresses 12B-1 of the radio network equipment distributed unit 10.

In some embodiments, the message 15 indicates said update 16 as part of indicating an update to multiple transport layer addresses 12A-1, . . . 12A-N of the radio network equipment distributed unit 10. In this case, the message 15 may indicate the update 16 to multiple transport layer addresses by indicating a mapping between old transport layer addresses 12A-1, . . . 12A-N and new transport layer addresses 12B-1, . . . 12B-N.

In some embodiments, the radio network equipment distributed unit 10 is a distributed unit of an integrated access backhaul, IAB, node 11, and the radio network equipment central unit 20 is a central unit of an IAB donor node 13. In this case, the method may also include changing a parent IAB node of the IAB node 11, or an IAB donor node of the IAB node 11 (Block 800), and performing the transmitting responsive to or as part of a procedure for said changing.

In some embodiments, the message 15 is a F1-AP gNB-DU configuration update message.

In some embodiments, the message 15 is agnostic to, or common for, user equipments served by the radio network equipment distributed unit 10.

In some embodiments, the radio network equipment distributed unit 10 is a distributed unit of an integrated access backhaul, IAB, node 11, and the radio network equipment central unit 20 is a central unit of an IAB donor 13.

In some embodiments, the radio network equipment distributed unit 10 is a distributed unit of radio network equipment 30 and the radio network equipment central unit 20 is a central unit of the same radio network equipment 30.

In some embodiments, the message 15 is an F1-AP message.

In some embodiments, the message 15 indicates that, for each of multiple user plane bearers associated with the radio network equipment distributed unit 10, a transport layer tunnel endpoint 17-1-DU of the user plane bearer is to be updated based on the message 15.

In some embodiments, the message 15 indicates that, for each of multiple user plane bearers associated with the radio network equipment distributed unit 10, a transport layer address of a transport layer tunnel endpoint of the user plane bearer is to be changed from the old transport layer address 12A to the new transport layer address 12B.

In some embodiments, a transport layer tunnel endpoint is an endpoint of an F1-U tunnel, or a GTP-U tunnel, between the radio network equipment distributed unit 10 and the radio network equipment central unit 20.

In some embodiments, a DU part of an IAB node or a DU part of a gNB may be generalized as a radio network equipment distributed unit 10, a CU part of an IAB node or a CU part of a gNB may be generalized as a radio network equipment central unit 20, a TNL address or IP address may be generalized as a transport layer address, an F1-U bearer or DRB may be generalized as a user plane bearer, and the endpoints of an F1-U tunnel or GTP-U tunnel may be generalized as transport layer tunnel endpoints of a user plane bearer.

In some embodiments, the method in FIG. 8 is exemplified by Embodiment 1a and 1c below from the perspective of the DU part of the IAB node, or exemplified by Embodiment 5 below from the perspective of the DU.

FIG. 9 more particularly depicts a method performed by the radio network equipment central unit 20 in accordance with other embodiments. The method includes receiving, from a radio network equipment distributed unit 10, a message 15 that indicates an update 16 to a transport layer address 12A-1 of a radio network equipment distributed unit 10 from an old transport layer address 12A to a new transport layer address 12B (Block 900). In some embodiments, the method may also include for each of multiple user plane bearers associated with the radio network equipment distributed unit, updating a transport layer tunnel endpoint of the user plane bearer based on the received message (Block 910). For example, in one embodiment, updating a transport layer tunnel endpoint of the user plane bearer based on the received message comprises changing a transport layer address of the transport layer tunnel endpoint from the old transport layer address to the new transport layer address.

In some embodiments, the method further comprises, for each of multiple user plane bearers associated with the radio network equipment distributed unit, updating a transport layer tunnel endpoint of the user plane bearer based on the received message. For example, in some embodiments, updating a transport layer tunnel endpoint of the user plane bearer based on the received message comprises changing a transport layer address of the transport layer tunnel endpoint from the old transport layer address to the new transport layer address.

In some embodiments, the message also indicates an update to one or more other transport layer addresses of the radio network equipment distributed unit.

In some embodiments, the message indicates said update as part of indicating an update to multiple transport layer addresses of the radio network equipment distributed unit, wherein the message indicates the update to multiple transport layer addresses by indicating a mapping between old transport layer addresses and new transport layer addresses.

In some embodiments, the message is a F1-AP gNB-DU configuration update message.

In some embodiments, the message is agnostic to, or common for, user equipments served by the radio network equipment distributed unit.

In some embodiments, the radio network equipment distributed unit is a distributed unit of an integrated access backhaul, IAB, node, and the radio network equipment central unit is a central unit of an IAB donor node.

In some embodiments, receiving of the message is performed responsive to, or as part of a procedure for, a change in a parent IAB node of the IAB node or an IAB donor node of the IAB node.

In some embodiments, the radio network equipment distributed unit is a distributed unit of radio network equipment and the radio network equipment central unit is a central unit of the same radio network equipment.

In some embodiments, the message is an F1-AP message.

In some embodiments, a transport layer tunnel endpoint is an endpoint of an F1-U tunnel, or a GTP-U tunnel, between the radio network equipment distributed unit and the radio network equipment central unit.

In some embodiments, a DU part of an IAB node or a DU part of a gNB may be generalized as a radio network equipment distributed unit, a CU part of an IAB node or a CU part of a gNB may be generalized as a radio network equipment central unit, a TNL address or IP address may be generalized as a transport layer address, an F1-U bearer or DRB may be generalized as a user plane bearer, and the endpoints of an F1-U tunnel or GTP-U tunnel may be generalized as transport layer tunnel endpoints of a user plane bearer.

In some embodiments, the method in FIG. 9 is exemplified by Embodiment 1b and 1d below from the perspective of the DU part of the IAB node, or exemplified by Embodiment 5 below from the perspective of the DU.

FIG. 10 depicts a method performed by a radio network equipment distributed unit in accordance with particular embodiments. The method includes transmitting, to a radio network equipment central unit, a message that indicates, for each of multiple user plane bearers associated with the radio network equipment distributed unit, an update to transport layer information for a transport layer tunnel endpoint of the user plane bearer from old transport layer information to new transport layer information (Block 1010).

In some embodiments, the old transport layer information includes an old transport layer address and an old tunnel endpoint identity, TEID, and the new transport layer information includes a new transport layer address and a new TEID.

In some embodiments, the message is a F1-AP gNB-DU configuration update message. In some embodiments, the message is agnostic to, or common for, user equipments served by the radio network equipment distributed unit.

In some embodiments, the radio network equipment distributed unit is a distributed unit of radio network equipment and the radio network equipment central unit is a central unit of the same radio network equipment.

In some embodiments, the message is an F1-AP message.

In some embodiments, the radio network equipment distributed unit is a distributed unit of an integrated access backhaul, IAB, node, and the radio network equipment central unit is a central unit of an IAB donor node. In this case, the method may also include changing a parent IAB node of the IAB node, or an IAB donor node of the IAB node (Block 1000), and performing the transmitting responsive to or as part of a procedure for said changing.

In some embodiments, a DU part of an IAB node or a DU part of a gNB may be generalized as a radio network equipment distributed unit, a CU part of an IAB node or a CU part of a gNB may be generalized as a radio network equipment central unit, a TNL address or IP address may be generalized as a transport layer address, an F1-U bearer or DRB may be generalized as a user plane bearer, and the endpoints of an F1-U tunnel or GTP-U tunnel may be generalized as transport layer tunnel endpoints of a user plane bearer.

In some embodiments, the method in FIG. 10 is exemplified by Embodiment 1b and 1d below from the perspective of the DU part of the IAB node, or exemplified by Embodiment 5 below from the perspective of the DU.

FIG. 11 depicts a method performed by a radio network equipment central unit in accordance with other particular embodiments. The method includes receiving, from a radio network equipment central unit, a message that indicates, for each of multiple user plane bearers associated with the radio network equipment distributed unit, an update to transport layer information for a transport layer tunnel endpoint of the user plane bearer from old transport layer information to new transport layer information (Block 1100). In some embodiments, the method may also include for each of the multiple user plane bearers associated with the radio network equipment distributed unit, updating transport layer information for a transport layer tunnel endpoint of the user plane bearer from the old transport layer information to the new transport layer information (Block 1110).

In some embodiments, the old transport layer information includes an old transport layer address and an old tunnel endpoint identity, TEID, and wherein the new transport layer information includes a new transport layer address and a new TEID.

In some embodiments, the message is a F1-AP gNB-DU configuration update message.

In some embodiments, the message is agnostic to, or common for, user equipments served by the radio network equipment distributed unit.

In some embodiments, the radio network equipment distributed unit is a distributed unit of an integrated access backhaul, IAB, node, and wherein the radio network equipment central unit of an IAB donor node. In one such embodiment, receiving of the message is performed responsive to, or as part of a procedure for, a change in a parent IAB node of the IAB node or an IAB donor node of the IAB node.

In some embodiments, the radio network equipment distributed unit is a distributed unit of radio network equipment and the radio network equipment central unit is a central unit of the same radio network equipment.

In some embodiments, the message is an F1-AP message.

In some embodiments, a DU part of an IAB node or a DU part of a gNB may be generalized as a radio network equipment distributed unit, a CU part of an IAB node or a CU part of a gNB may be generalized as a radio network equipment central unit, a TNL address or IP address may be generalized as a transport layer address, an F1-U bearer or DRB may be generalized as a user plane bearer, and the endpoints of an F1-U tunnel or GTP-U tunnel may be generalized as transport layer tunnel endpoints of a user plane bearer.

In some embodiments, the method in FIG. 11 is exemplified by Embodiment 1b and 1d below from the perspective of the CU part of the IAB donor, or exemplified by Embodiment 5 below from the perspective of the CU.

FIG. 12 depicts a method performed by a distributed unit of an integrated access backhaul, IAB, donor that is a donor for an IAB node in accordance with particular embodiments. The method includes transmitting, to a central unit of the IAB donor, a message that indicates an update to a transport layer address of the IAB node from an old transport layer address to a new transport layer address (Block 1210). In some embodiments, the method may also include determining that the transport layer address of the IAB node has changed (Block 1200), and performing the transmitting in response.

In some embodiments, the message also indicates an update to one or more other transport layer addresses of the IAB node.

In some embodiments, the message indicates said update as part of indicating an update to multiple transport layer addresses of the IAB node. In this case, the message indicates the update to multiple transport layer addresses by indicating a mapping between old transport layer addresses and new transport layer addresses.

In some embodiments, the message is a F1-AP gNB-DU configuration update message.

In some embodiments, the message is agnostic to, or common for, user equipments served by the IAB node.

In some embodiments, the message is an F1-AP message.

In some embodiments, a DU part of an IAB node or a DU part of a gNB may be generalized as a radio network equipment distributed unit, a CU part of an IAB node or a CU part of a gNB may be generalized as a radio network equipment central unit, a TNL address or IP address may be generalized as a transport layer address, an F1-U bearer or DRB may be generalized as a user plane bearer, and the endpoints of an F1-U tunnel or GTP-U tunnel may be generalized as transport layer tunnel endpoints of a user plane bearer.

In some embodiments, the method in FIG. 12 is exemplified by Embodiment 2 below from the perspective of the DU part of the IAB donor.

FIG. 13 depicts a method performed by a central unit of an integrated access backhaul, IAB, donor that is a donor for an IAB node in accordance with other particular embodiments. The method includes receiving, from a distributed unit of the IAB donor, a message that indicates an update to a transport layer address of the IAB node from an old transport layer address to a new transport layer address (Block 1300). In some embodiments, the method may also include, for each of multiple user plane bearers served via the IAB node, updating a transport layer tunnel endpoint of the user plane bearer based on the received message (Block 1310). For example, in some embodiments, updating a transport layer tunnel endpoint of the user plane bearer based on the received message comprises changing a transport layer address of the transport layer tunnel endpoint from the old transport layer address to the new transport layer address.

In some embodiments, the message also indicates an update to one or more other transport layer addresses of the IAB node.

In some embodiments, the message indicates said update as part of indicating an update to multiple transport layer addresses of the IAB node. In this case, the message indicates the update to multiple transport layer addresses by indicating a mapping between old transport layer addresses and new transport layer addresses.

In some embodiments, the message is a F1-AP gNB-DU configuration update message.

In some embodiments, the message is agnostic to, or common for, user equipments served by the IAB node.

In some embodiments, the message is an F1-AP message.

In some embodiments, a DU part of an IAB node or a DU part of a gNB may be generalized as a radio network equipment distributed unit, a CU part of an IAB node or a CU part of a gNB may be generalized as a radio network equipment central unit, a TNL address or IP address may be generalized as a transport layer address, an F1-U bearer or DRB may be generalized as a user plane bearer, and the endpoints of an F1-U tunnel or GTP-U tunnel may be generalized as transport layer tunnel endpoints of a user plane bearer.

In some embodiments, the method in FIG. 13 is exemplified by Embodiment 2 below from the perspective of the CU part of the IAB donor.

Figure 14:
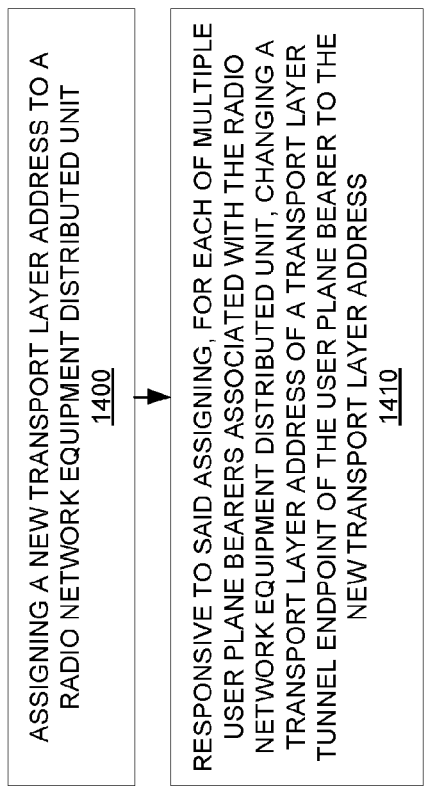
FIG. 14 is a logic flow diagram of a method performed by a radio network equipment central unit according to other embodiments.

FIG. 14 depicts a method performed by a radio network equipment central unit in accordance with other particular embodiments. The method includes assigning a new transport layer address to a radio network equipment distributed unit (Block 1400). In some embodiments, the method may also include responsive to said assigning, for each of multiple user plane bearers associated with the radio network equipment distributed unit, changing a transport layer address of a transport layer tunnel endpoint of the user plane bearer to the new transport layer address (Block 1410).

In some embodiments, the radio network equipment distributed unit is a distributed unit of an integrated access backhaul, IAB, node, and the radio network equipment central unit of an IAB donor node. In one such embodiment, said assigning is performed responsive to, or as part of a procedure for, a change in a parent IAB node of the IAB node or an IAB donor node of the IAB node.

In some embodiments, the radio network equipment distributed unit is a distributed unit of radio network equipment and the radio network equipment central unit is a central unit of the same radio network equipment.

In some embodiments, a DU part of an IAB node or a DU part of a gNB may be generalized as a radio network equipment distributed unit, a CU part of an IAB node or a CU part of a gNB may be generalized as a radio network equipment central unit, a TNL address or IP address may be generalized as a transport layer address, an F1-U bearer or DRB may be generalized as a user plane bearer, and the endpoints of an F1-U tunnel or GTP-U tunnel may be generalized as transport layer tunnel endpoints of a user plane bearer.

In some embodiments, the method in FIG. 14 is exemplified by Embodiment 3 above from the perspective of the CU part of the IAB donor, or exemplified by Embodiment 5 below from the perspective of the CU.

Embodiments herein also include corresponding apparatuses. Embodiments herein for instance include a radio network equipment distributed unit 10 configured to perform any of the steps of any of the embodiments described above for the radio network equipment distributed unit 10.

Embodiments also include a radio network equipment distributed unit 10 comprising processing circuitry and power supply circuitry. The processing circuitry is configured to perform any of the steps of any of the embodiments described above for the radio network equipment distributed unit. The power supply circuitry is configured to supply power to the radio network equipment distributed unit 10.

Embodiments further include a radio network equipment distributed unit 10 comprising processing circuitry. The processing circuitry is configured to perform any of the steps of any of the embodiments described above for the radio network equipment distributed unit 10. In some embodiments, the radio network equipment distributed unit 10 further comprises communication circuitry.

Embodiments further include a radio network equipment distributed unit 10 comprising processing circuitry and memory. The memory contains instructions executable by the processing circuitry whereby the radio network equipment distributed unit 10 is configured to perform any of the steps of any of the embodiments described above for the radio network equipment distributed unit 10.

Embodiments herein moreover include a radio network equipment central unit 20 configured to perform any of the steps of any of the embodiments described above for the radio network equipment central unit 20.

Embodiments also include a radio network equipment central unit 20 comprising processing circuitry and power supply circuitry. The processing circuitry is configured to perform any of the steps of any of the embodiments described above for the radio network equipment central unit 20. The power supply circuitry is configured to supply power to the radio network equipment central unit 20.

Embodiments further include a radio network equipment central unit 20 comprising processing circuitry. The processing circuitry is configured to perform any of the steps of any of the embodiments described above for the radio network equipment central unit 20. In some embodiments, the radio network equipment central unit 20 further comprises communication circuitry.

Embodiments further include a radio network equipment central unit 20 comprising processing circuitry and memory. The memory contains instructions executable by the processing circuitry whereby the radio network equipment central unit 20 is configured to perform any of the steps of any of the embodiments described above for the radio network equipment central unit 20.

Generally, the term radio network equipment may refer to any type of radio network equipment, e.g., whether or not the radio network equipment implements a central unit or a distributed unit as discussed herein.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 15:
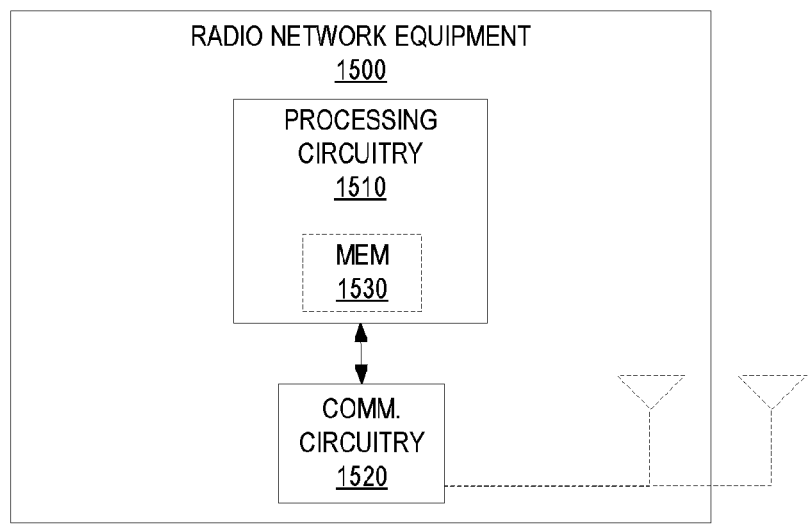
FIG. 15 is a block diagram of radio network equipment according to some embodiments.

FIG. 15 for example illustrates radio network equipment 1500 (e.g., configured to implement radio network equipment distributed unit 10 or 40) according to one or more embodiments. As shown, the radio network equipment 1500 includes processing circuitry 1510 and communication circuitry 1520. The communication circuitry 1520 (e.g., radio circuitry) is configured to transmit and/or receive information to and/or from one or more other nodes, e.g., via any communication technology. Such communication may occur via one or more antennas that are either internal or external to the radio network equipment distributed unit 1500. The processing circuitry 1510 is configured to perform processing described above, e.g., in FIG. 7A, such as by executing instructions stored in memory 1530. The processing circuitry 1510 in this regard may implement certain functional means, units, or modules.

Figure 16:
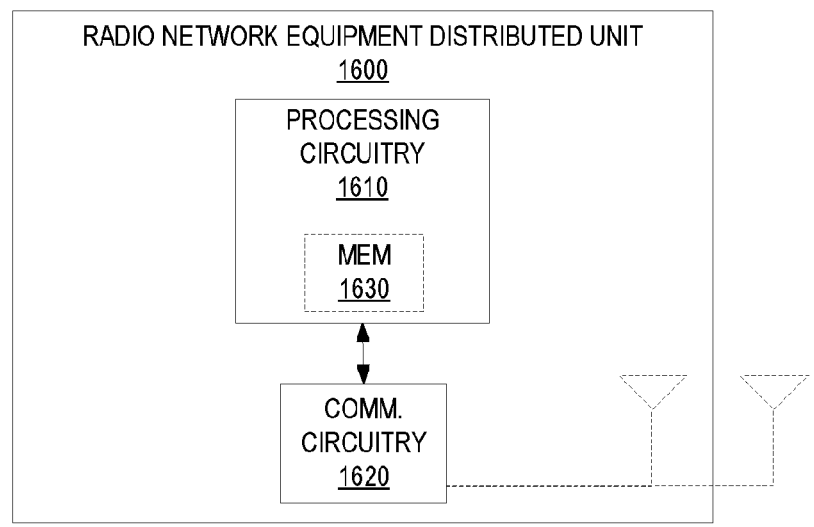
FIG. 16 is a block diagram of a radio network equipment distributed unit according to some embodiments.

FIG. 16 illustrates a radio network equipment distributed unit 1600 (e.g., radio network equipment distributed unit 10 or 40) as implemented in accordance with one or more embodiments. As shown, the radio network equipment distributed unit 1600 includes processing circuitry 1610 and communication circuitry 1620. The communication circuitry 1620 (e.g., radio circuitry) is configured to transmit and/or receive information to and/or from one or more other nodes, e.g., via any communication technology. Such communication may occur via one or more antennas that are either internal or external to the radio network equipment distributed unit 1600. The processing circuitry 1610 is configured to perform processing described above, e.g., in FIGS. 7A, 8, 10, and/or 12, such as by executing instructions stored in memory 1630. The processing circuitry 1610 in this regard may implement certain functional means, units, or modules.

Figure 17:
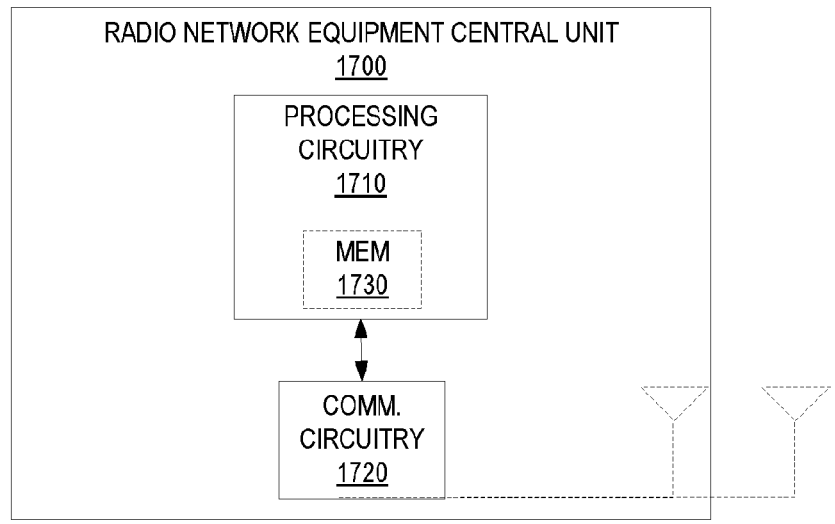
FIG. 17 is a block diagram of a radio network equipment central unit according to some embodiments.

FIG. 17 illustrates a radio network equipment central unit 1700 (e.g., radio network equipment central unit 20) as implemented in accordance with one or more embodiments. As shown, the radio network equipment central unit 1700 includes processing circuitry 1710 and communication circuitry 1720. The communication circuitry 1720 (e.g., radio circuitry) is configured to transmit and/or receive information to and/or from one or more other nodes, e.g., via any communication technology. Such communication may occur via one or more antennas that are either internal or external to the radio network equipment central unit 1700. The processing circuitry 1710 is configured to perform processing described above, e.g., in FIGS. 7B, 9, 11, 13, and/or 14, such as by executing instructions stored in memory 1730. The processing circuitry 1710 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 18:
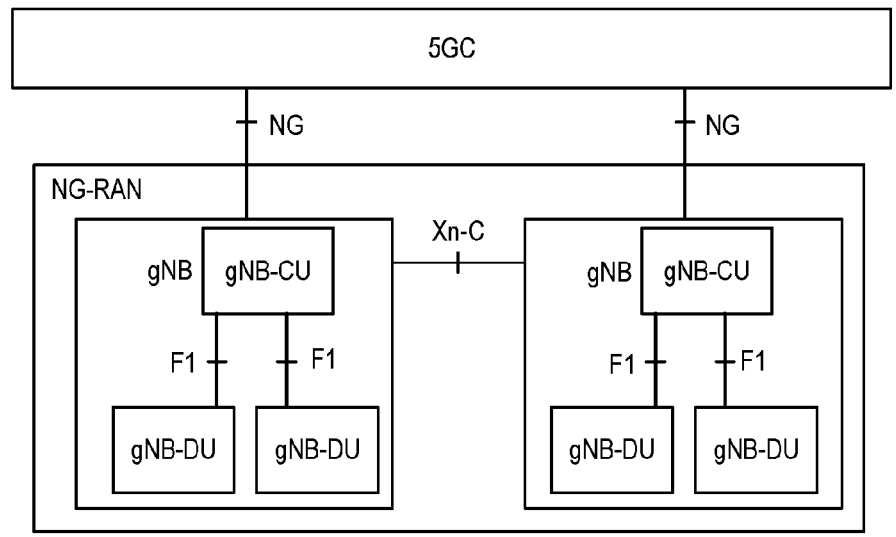
FIG. 18 is a block diagram of the fifth-generation (5G) network architecture for the 5G wireless communications system according to some embodiments.

FIG. 18 illustrates a high-level view of the fifth-generation (5G) network architecture for the 5G wireless communications system currently under development by the 3$^{rd}$-Generation Partnership Project (3GPP), consisting of a Next Generation Radio Access Network (NG-RAN) and a 5G Core (5GC). The NG-RAN can comprise a set of gNodeB's (gNBs) connected to the 5GC via one or more NG interfaces, whereas the gNBs can be connected to each other via one or more Xn interfaces. Each of the gNBs can support frequency division duplexing (FDD), time division duplexing (TDD), or a combination thereof. The radio technology for the NG-RAN is often referred to as "New Radio" (NR).

The NG RAN logical nodes shown in FIG. 18 (and described in 3GPP TS 38.401 version 15.2.0 and 3GPP TR 38.801 version 14.0.0) include a Central Unit (CU or gNB-CU) and one or more Distributed Units (DU or gNB-DU). The CU is a logical node that is a centralized unit that hosts high layer protocols, including terminating the Packet Data Convergence Protocol (PDCP) and Radio Resource Control (RRC) protocols towards the UE, and includes a number of gNB functions, including controlling the operation of DUs. A DU is a decentralized logical node that hosts lower layer protocols, including the Radio Link Control (RLC), Medium Access Control (MAC), and physical layer protocols, and can include, depending on the functional split option, various subsets of the gNB functions. (As used herein, the terms "central unit" and "centralized unit" are used interchangeably, and the terms "distributed unit" and "decentralized unit" are used interchangeability.) The gNB-CU connects to gNB-DUs over respective F1 logical interfaces, using the F1 application part protocol (F1-AP) which is defined in 3GPP TS 38.473 version 15.2.0. The gNB-CU and connected gNB-DUs are only visible to other gNBs and the 5GC as a gNB, i.e., the F1 interface is not visible beyond gNB-CU.

The NG-RAN is layered into a Radio Network Layer (RNL) and a Transport Network Layer (TNL). The NG-RAN architecture, i.e. the NG-RAN logical nodes and interfaces between them, is defined as part of the RNL. For each NG-RAN interface (NG, Xn, F1) the related TNL protocol and the functionality are specified. The TNL provides services for user plane transport and signalling transport. In NG-Flex configuration, each gNB is connected to all Access and Mobility Functions (AMFs) within an AMF Region. The AMF Region is defined in 3GPP TS 23.501 version 15.2.0.

As noted above, the CU can host protocols such as RRC and PDCP, while a DU can host protocols such as RLC, MAC and PHY. Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some exemplary embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

Figure 19A:
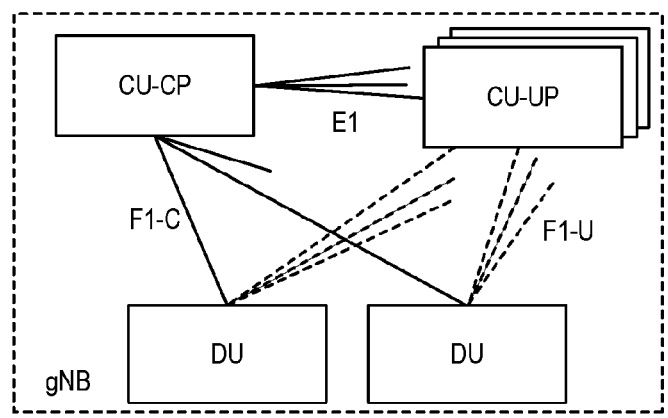
FIG. 19A is a block diagram of a gNB with separation between a central unit for the control plane and a central uni for the user plane, according to some embodiments.

The gNB-CU may be separated into a CU-CP (control plane) function (including RRC and PDCP for signaling radio bearers) and CU-UP (user plane) function (including PDCP for user plane). The CU-CP and CU-UP parts communicate with each other using the E1-AP protocol over the E1 interface. The E1 application protocol (E1AP) is defined in TS 38.463 version 15.0.0. The E1AP defines the messages that are exchanged between the CU-CP and the CU-UP for the sake of providing user-plane services to the UE. The CU-CP/UP separation is illustrated in FIG. 19A. As shown, control plane (CP) communication between the DU and CU (e.g., CU-CP) occurs over the F1-C interface, whereas user plane (UP) communication between the DU and the CU (e.g., the CU-UP) occurs over the F1-U interface.

Figure 19B:
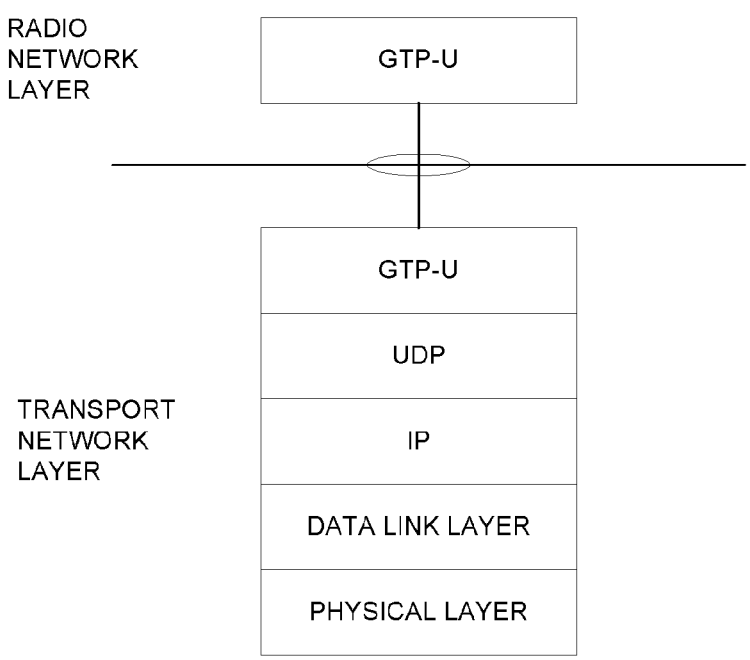
FIG. 19B is a block diagram of the protocol structure for an F1 user plane (F1-U) interface according to some embodiments.

FIG. 19B shows the protocol structure for F1-U. The TNL is based on Internet Protocol (IP) transport, comprising the User Datagram Protocol (UDP) and GTP-U (General Packet Radio Service, GPRS, Tunneling Protocol User-plane) on top of IP. The F1-U provides the transfer of UP data and also flow control between the CU and DU. The details of the NR user plane protocol and the supported flow control can be found in TS 38.425 version 15.2.0.

The F1-AP protocol, specified in TS 38.473 version 15.2.0, is used to setup/(re)configure the tunnels that are to be used for the F1-U. This is accomplished via the F1-AP UE context setup and modification procedures. The F1-C is also used for setting up the F1 to begin with (via F1 setup procedures) and reconfiguring it (via gNB-CU/DU update procedures).

Three deployment scenarios for the split gNB are shown in TR 38.806 version 15.0.0. In Scenario 1, CU-CP and CU-UP are both centralized. In Scenario 2, CU-CP is distributed and CU-UP are centralized. In Scenario 3, CU-CP is centralized and CU-UP is distributed.

Densification via the deployment of more and more base stations (e.g., macro or micro base stations) is one of the mechanisms that can be employed to satisfy the increasing demand for bandwidth and/or capacity in mobile networks, which is mainly driven by the increasing use of video streaming services. Due to the availability of more spectrum in the millimeter wave (mmw) band, deploying small cells that operate in this band is an attractive deployment option for these purposes. However, the normal approach of connecting the small cells to an operator's backhaul network with optical fiber can end up being very expensive and impractical. Employing wireless links for connecting the small cells to the operator's network is a cheaper and more practical alternative. One such approach is an integrated access backhaul (IAB) network, where the operator can utilize part of the available radio resources for the backhaul link.

IAB has been studied earlier in 3GPP in the scope of Long Term Evolution (LTE) Release 10 (Rel-10). In that work, an architecture was adopted where a Relay Node (RN) has the functionality of an LTE eNB and UE modem. The RN is connected to a donor eNB which has a S1/X2 proxy functionality hiding the RN from the rest of the network. That architecture enabled the Donor eNB to also be aware of the UEs behind the RN and hide any UE mobility between Donor eNB and Relay Node on the same Donor eNB from the CN. During the Rel-10 study, other architectures were also considered including, e.g., where the RNs are more transparent to the Donor gNB and allocated a separate stand-alone P/S-GW node.

For 5G/NR, similar options utilizing IAB can also be considered. One difference compared to LTE is the gNB-CU/DU split described above, which separates time-critical RLC/MAC/PHY protocols from less time-critical RRC/PDCP protocols. It is anticipated that a similar split could also be applied for the IAB case. Other IAB-related differences anticipated in NR as compared to LTE are the support of multiple hops and the support of redundant paths.

Currently in 3GPP the following architectures for supporting user plane traffic over IAB node has been captured in 3GPP TS 38.874 (version 0.2.1).

Figure 20:
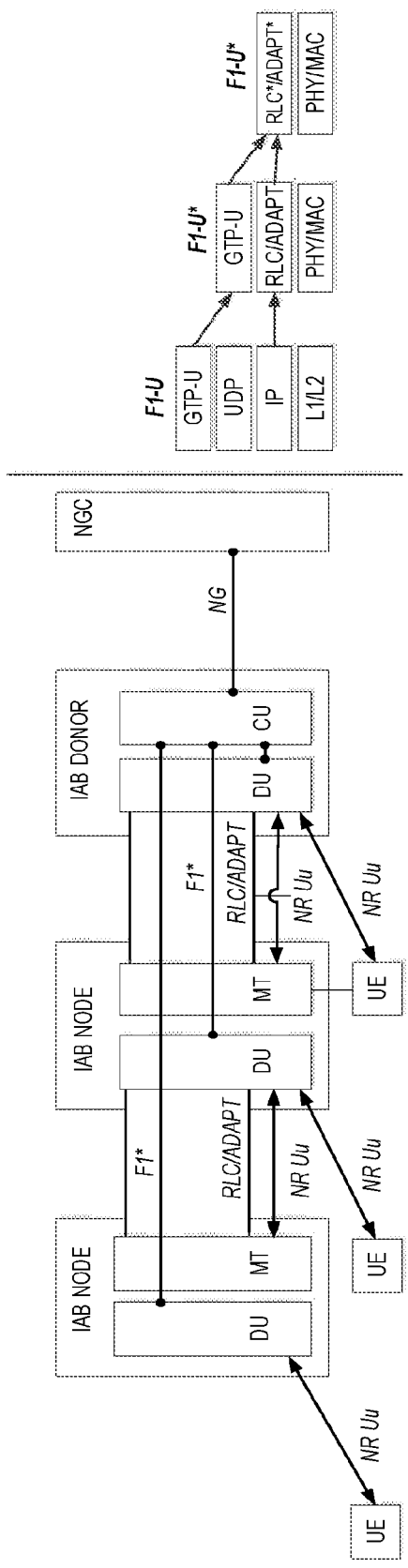
FIG. 20 is a block diagram of a two-hop chain of integrated access backhaul (IAB) nodes underneath an IAB donor according to some embodiments.

Architecture 1a leverages a CU/DU-split architecture. FIG. 20 shows the reference diagram for a two-hop chain of IAB nodes underneath an IAB donor. In this architecture, each IAB node holds a DU and a Mobile Termination (MT), the latter of which is a function residing on the IAB node that terminates the radio interface layers of the backhaul Uu interface toward the IAB donor or other IAB nodes. Effectively, the MT stands in for a UE on the Uu interface to the upstream relay node. Via the MT, the IAB node connects to an upstream IAB node or the IAB donor. Via the DU, the IAB node establishes RLC channels to UEs and to MTs of downstream IAB nodes. For MTs, this RLC channel may refer to a modified RLC*.

The donor also holds a DU to support UEs and MTs of downstream IAB-nodes. The IAB-donor holds a CU for the DUs of all IAB-nodes and for its own DU. Each DU on an IAB-node connects to the CU in the IAB-donor using a modified form of F1, which is referred to as F1*. F1*-U runs over RLC channels on the wireless backhaul between the MT on the serving IAB-node and the DU on the donor. F1*-U provides transport between MT and DU on the serving IAB-node as well as between DU and CU on the donor. An adaptation layer is added, which holds routing information, enabling hop-by-hop forwarding. It replaces the IP functionality of the standard F1-stack. F1*-U may carry a General Packet Radio Service Tunneling Protocol (GTP-U) header for the end-to-end association between CU and DU. In a further enhancement, information carried inside the GTP-U header may be included in the adaption layer. Further, optimizations to RLC may be considered such as applying ARQ only on the end-to-end connection opposed to hop-by-hop. The right side of FIG. 20 shows two examples of such F1*-U protocol stacks. In this figure, enhancements of RLC are referred to as RLC*. The MT of each IAB-node further sustains Non-Access Stratum (NAS) connectivity to the Next Generation Core (NGC), e.g., for authentication of the IAB-node. It further sustains a Protocol Data Unit (PDU)-session via the NGC, e.g., to provide the IAB-node with connectivity to the Operations, Administration and Maintenance (OAM).

Figure 21:
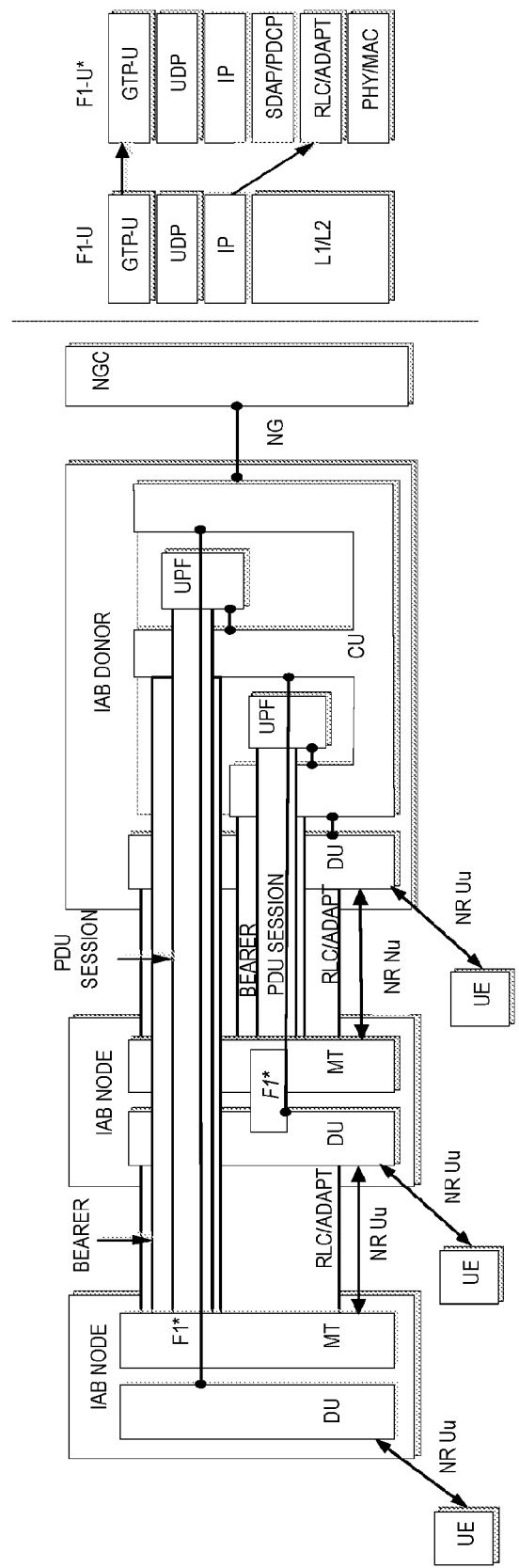
FIG. 21 is a block diagram of a two-hop chain of integrated access backhaul (IAB) nodes underneath an IAB donor according to other embodiments.

Architecture 1b also leverages a CU/DU-split architecture. FIG. 21 shows the reference diagram for a two-hop chain of IAB nodes underneath an IAB donor. Note that the IAB donor only holds one logical CU.

In this architecture, each IAB node and the IAB donor hold the same functions as in architecture 1a. Also, as in architecture 1a, every backhaul link establishes an RLC channel, and an adaptation layer is inserted to enable hop-by-hop forwarding of F1*.

As opposed to architecture 1a, the MT on each IAB-node establishes a PDU-session with a UPF residing on the donor. The MT's PDU-session carries F1* for the collocated DU. In this manner, the PDU-session provides a point-to-point link between CU and DU. On intermediate hops, the PDCP-PDUs of F1* are forwarded via adaptation layer in the same manner as described for architecture 1a. The right side of FIG. 21 shows an example of the F1*-U protocol stack.

Various user plane aspects for architecture group 1 include placement of an adaptation layer, functions supported by the adaptation layer, support of multi-hop RLC, impacts on scheduler and QoS.

The UE establishes RLC channels to the DU on the UE's access IAB node in compliance with TS 38.300 version 15.2.0. Each of these RLC-channels is extended via a potentially modified form of F1-U, referred to as F1*-U, between the UE's access DU and the IAB donor. The information embedded in F1*-U is carried over RLC-channels across the backhaul links.

Transport of F1*-U over the wireless backhaul is enabled by an adaptation layer, which is integrated with the RLC channel. Within the IAB-donor (referred to as fronthaul), the baseline is to use native F1-U stack (3GPP TS 38.474 version 15.0.0). The IAB-donor DU relays between F1-U on the fronthaul and F1*-U on the wireless backhaul.

In architecture 1a, information carried on the adaptation layer supports the following functions, among others: identification of the UE-bearer for the PDU; routing across the wireless backhaul topology; Quality-of-Service (QoS)-enforcement by the scheduler on downlink and uplink on the wireless backhaul link; and mapping of UE user-plane PDUs to backhaul RLC channels.

In architecture 1b, information carried on the adaptation layer supports the following functions, among others: routing across the wireless backhaul topology; QoS-enforcement by the scheduler on DL and UL on the wireless backhaul link; and mapping of UE user-plane PDUs to backhaul RLC channels.

Information to be carried on the adaptation layer header may include: UE-bearer-specific Id; UE-specific Id; Route Id, IAB-node or IAB-donor address; QoS information; and potentially other information.

Figure 22A:
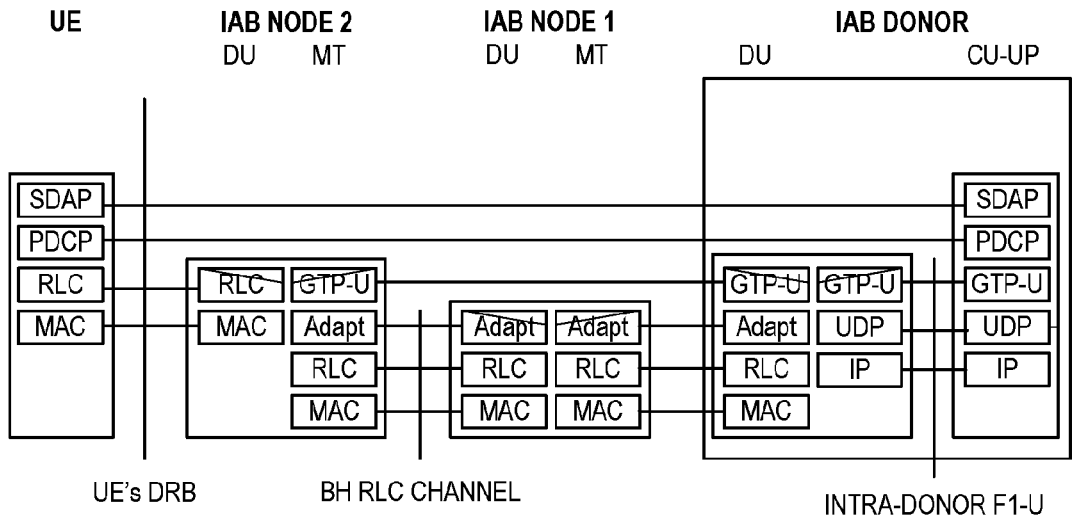
FIG. 22A is a block diagram of protocol stacks for the IAB, with an adaptation layer above an RLC layer, according to some embodiments.
Figure 22B:
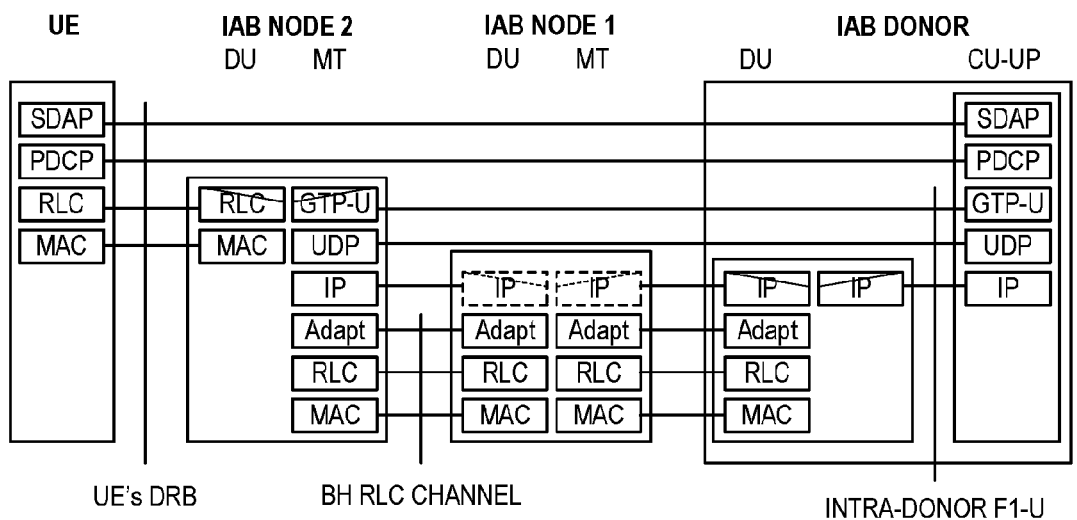
FIG. 22B is a block diagram of protocol stacks for the IAB, with an adaptation layer above an RLC layer, according to other embodiments.
Figure 23:
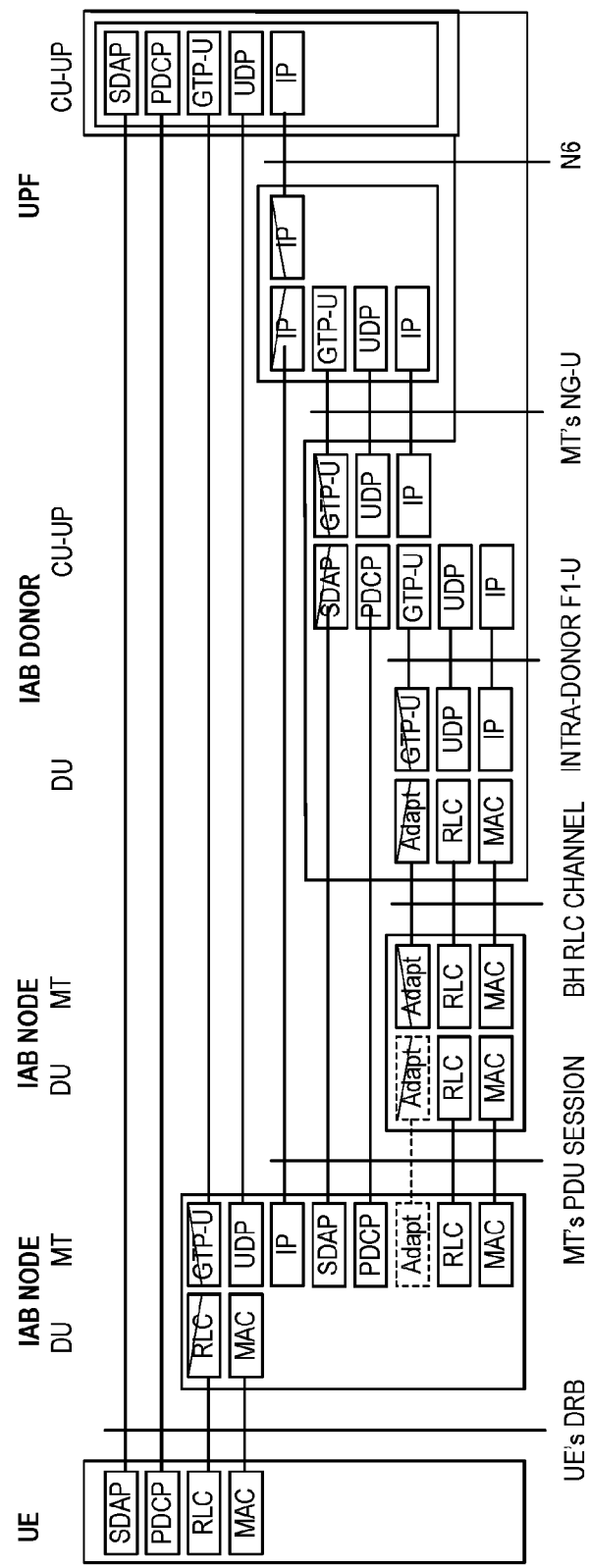
FIG. 23 is a block diagram of protocol stacks for the IAB, with an adaptation layer above an RLC layer, according to still other embodiments.

Adaptation layer placements may be integrated with above RLC layer (examples shown in FIGS. 22A, 22B and FIG. 23). Note that in FIG. 22B a GTP-U tunnel extends between the IAB Node 2 and the CU-UP at the IAB Donor. That is, the endpoints of the GTP-U tunnel are the IAB Node 2 and the CU-UP. This GTP-U tunnel may be an example of the tunnel 17-1 shown in FIG. 1. By contrast, two GTP-U tunnels exist in FIG. 22A, one between the IAB Node 2 and the IAB Donor DU, and another between the IAB Donor DU and the CU-UP. The IAB Donor DU in some sense functions as a proxy for IAB Node 2. Either or both of these GTP-U tunnels in combination in FIG. 22 may be an example of the tunnel 17-1 in FIG. 1. Note also that FIGS. 22A, 22B, and 23 show the GTP-U protocol in the protocol stack of IAB Node's MT simply for ease of illustration. In fact, though, the GTP-U protocol is implemented by the IAB Node's DU, such that the IAB Node's DU terminates the GTP-U tunnel between the IAB Node 2 and the CU-UP.

FIGS. 22A, 22B, and 23 show example protocol stacks and do not preclude other possibilities. While RLC channels serving for backhauling include the adaptation layer, the adaptation layer may also be included in IAB-node access links (the adaptation layer in the IAB node is illustrated with a dashed outline in FIG. 23).

The adaptation layer may consist of sublayers. It is perceivable, for example, that the GTP-U header becomes a part of the adaptation layer. It is also possible that the GTP-U header is carried on top of the adaptation layer to carry end-to-end association between the IAB-node DU and the CU (an example is shown in FIG. 22A).

Alternatively, an IP header may be part of the adaptation layer or carried on top of the adaptation layer. One example is shown in FIG. 22B. In this example, the IAB-donor DU holds an IP routing function to extend the IP-routing plane of the fronthaul to the IP-layer carried by adapt on the wireless backhaul. This allows native F1-U to be established end-to-end, i.e. between IAB-node DUs and IAB-donor CU-UP. The scenario implies that each IAB-node holds an IP-address, which is routable from the fronthaul via the IAB-donor DU. The IAB-nodes' IP addresses may further be used for routing on the wireless backhaul.

Note that the IP layer on top of Adapt does not represent a PDU session. The MT's first hop router on this IP layer therefore does not have to hold a UPF.

There have been some observations on adaptation layer placement. The above-RLC adaptation layer can only support hop-by-hop ARQ. The above-MAC adaptation layer can support both hop-by-hop and end-to-end ARQ. Both adaptation layer placements can support aggregated routing, e.g., by inserting an IAB-node address into the adaptation header.

Both adaptation layer placements can support per-UE-bearer QoS for a large number of UE-bearers. For above-RLC adaptation layer, the LCID space has to be enhanced since each UE-bearer is mapped to an independent logical channel. For above-MAC adaptation layer, UE-bearer-related information has to be carried on the adaptation header. Both adaptation layer placements can support aggregated QoS handling, e.g., by inserting an aggregated QoS Id into the adaptation header. Aggregated QoS handling reduces the number of queues. This is independent of where the adaptation layer is placed. For both adaptation layer placements, aggregation of routing and QoS handling allows proactive configuration of intermediate on-path IAB-nodes, i.e., configuration is independent of UE-bearer establishment/release. For both adaptation layer placements, RLC ARQ can be pre-processed on the transmission side.

Topology adaptation has the goal to change the IAB-topology in order to ensure that an IAB node can continue to operate (including providing coverage and end user service continuity) even if the current active backhaul path is degraded or lost. It is also desirable to minimize service disruption and packet loss during topology adaptation. IAB Topology adaptation can be triggered by integration of an IAB node to the topology, detachment of an IAB node from the topology, detection of backhaul link over load, deterioration of backhaul link quality or link failure, or other events.

Topology adaptation includes the following tasks: (i) Information collection; (ii) Topology determination; and (iii) Topology reconfiguration. Information collection involves the collection of information such as backhaul link quality, link- and node-load, neighbor-node signal strength, and the like. Collection applies to a sufficiently large area of the IAB topology. Topology determination involves deciding the best topology based on the collected information and following a performance objective. Topology reconfiguration includes adjusting topology based on topology determination, through e.g. establishing new connections, releasing other connections, changing routes, etc.

The following discussion mainly focuses on topology reconfiguration. In this discussion, it is assumed that existing Rel-15 procedures for measurements, handover, dual-connectivity and F1-interface management are baseline for topology reconfiguration in architecture 1. Furthermore, Rel-16 related procedures should be considered when these procedures are available.

Figure 24B:
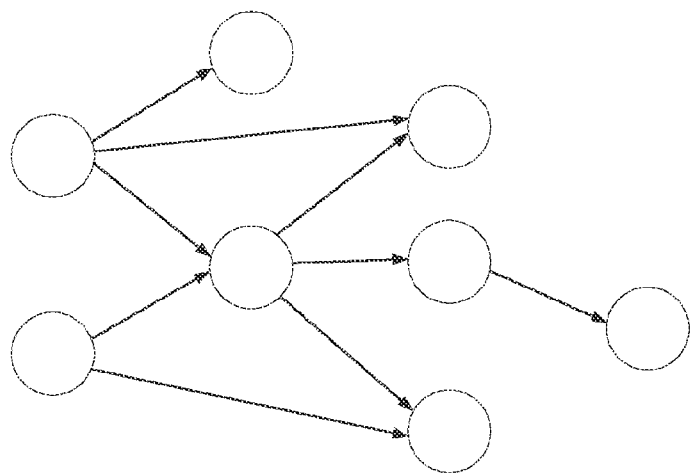
FIG. 24B is a block diagram of a directed acyclic graph topology of IAB nodes according to some embodiments.
Figure 24A:
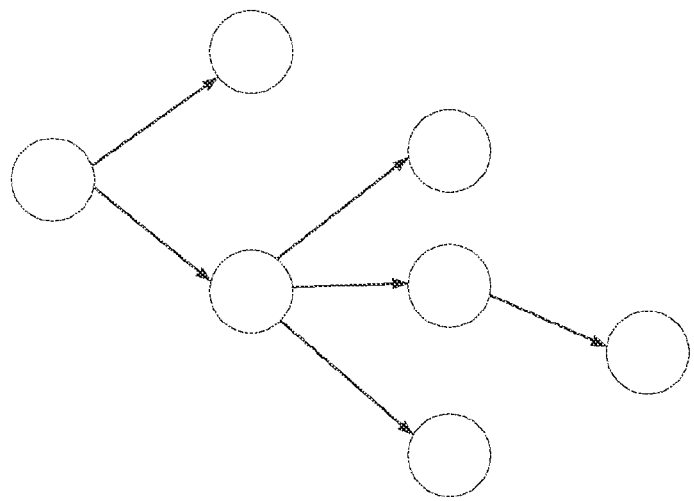
FIG. 24A is a block diagram of a spanning tree topology of IAB nodes according to some embodiments.

TR 38.874 (version 0.4.0) section 9.2 considers two topologies shown in FIGS. 24A and 24B; namely, Spanning tree (ST) topology (FIG. 24A) and Directed acyclic graph (DAG) topology (FIG. 24B). In ST-topologies, there is only one route between each IAB-node and the IAB-donor. In architecture group 1, where the IAB-donor holds one CU with one or multiple DUs, the graph underneath each IAB-donor DU represents a separate ST. In DAG-topologies, redundant routes are supported between each IAB-node and the CU. In architecture group 1, such route redundancy may involve multiple IAB-donor-DUs. Topologically redundant routes may simultaneously run traffic. It is also possible to keep one route active and assign backup status to a redundant route. In order to separate this case from the ST topology which could be dynamically reconfigured, at least control plane connectivity is assumed as simultaneously maintained on all paths in the DAG topology.

The following discussion focuses on the procedure for topology adaptation within a ST using architecture 1*a*. This discussion only addresses topology changes underneath the IAB-donor.

Figure 25B:
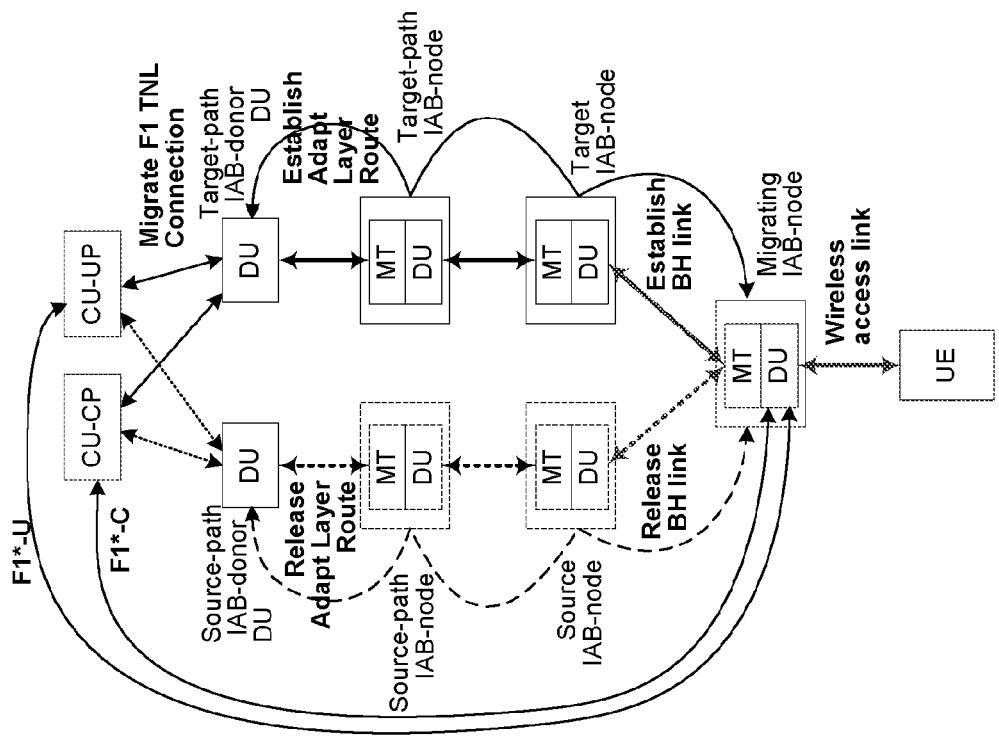
FIG. 25B is a block diagram of an IAB node after migrating from a source IAB node to a target IAB node in a spanning tree topology according to some embodiments.
Figure 25A:
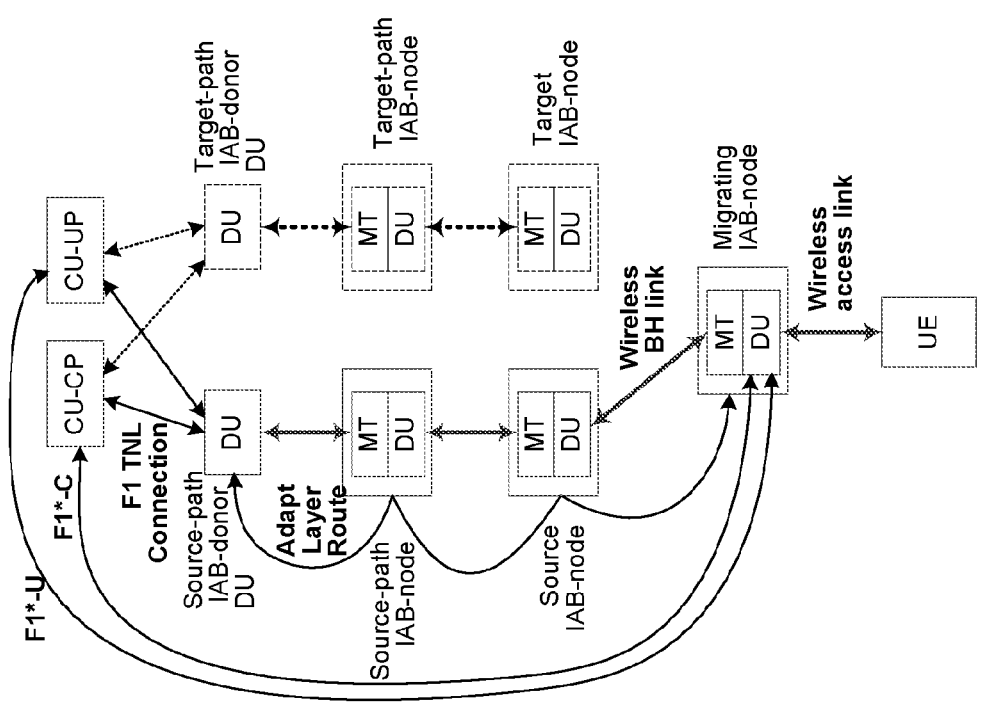
FIG. 25A is a block diagram of an IAB node before migrating from a source IAB node to a target IAB node in a spanning tree topology according to some embodiments.

FIGS. 25A and 25B show a ST topology with five IAB nodes connected to an IAB-donor which holds two DUs. One IAB-node in this topology, referred to as migrating IAB-node, changes its attachment point from a source parent node to a target parent node. The migrating IAB-node has one UE attached.

FIG. 25A shows the topology before the migration. FIG. 25B shows the topology after migration, and it indicates the links and routes that are established and released.

Figure 26A:
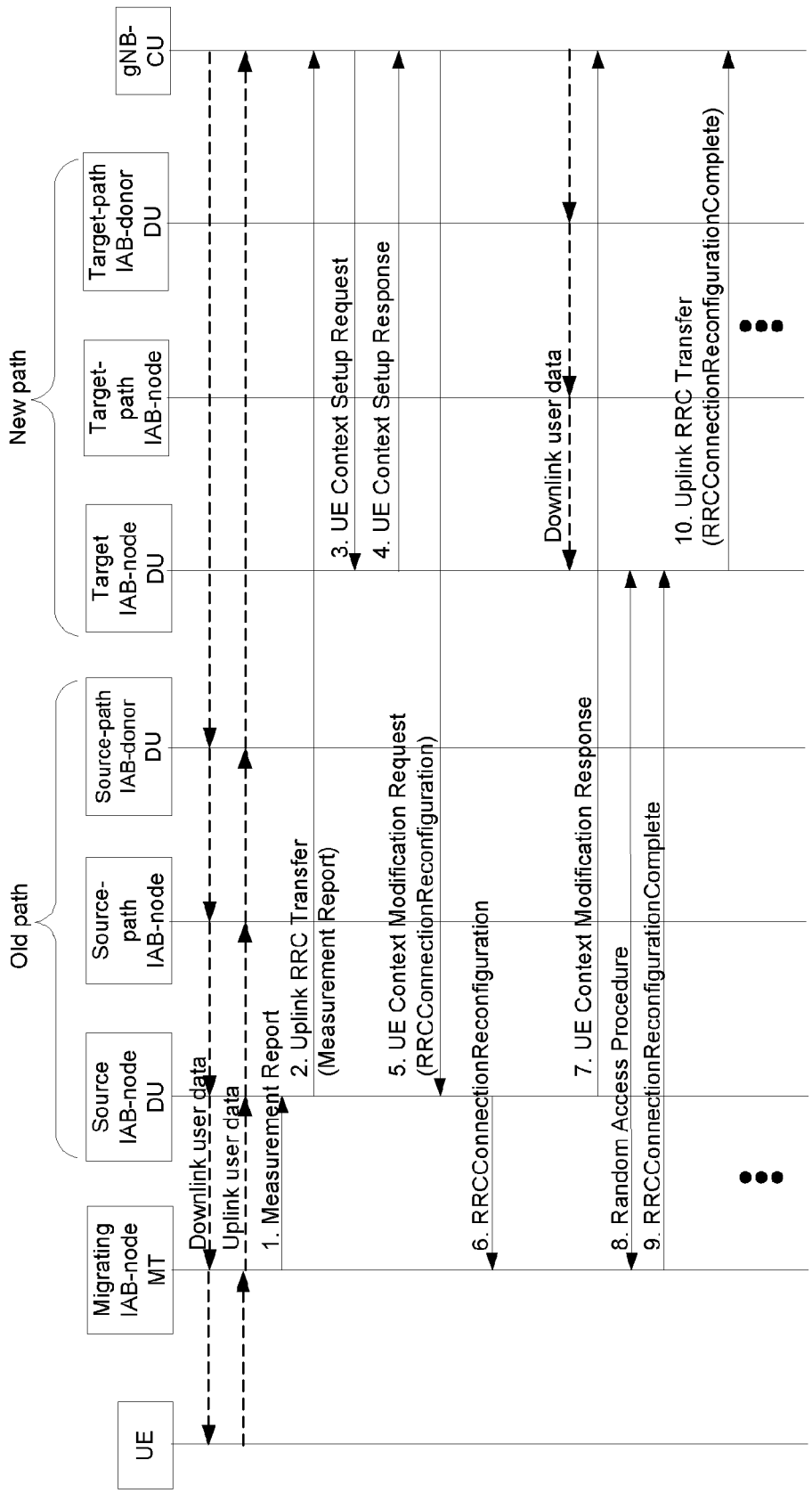
FIGS. 26A and 26B show procedure for adaptation of a spanning tree topology according to some embodiments.
Figure 26B:
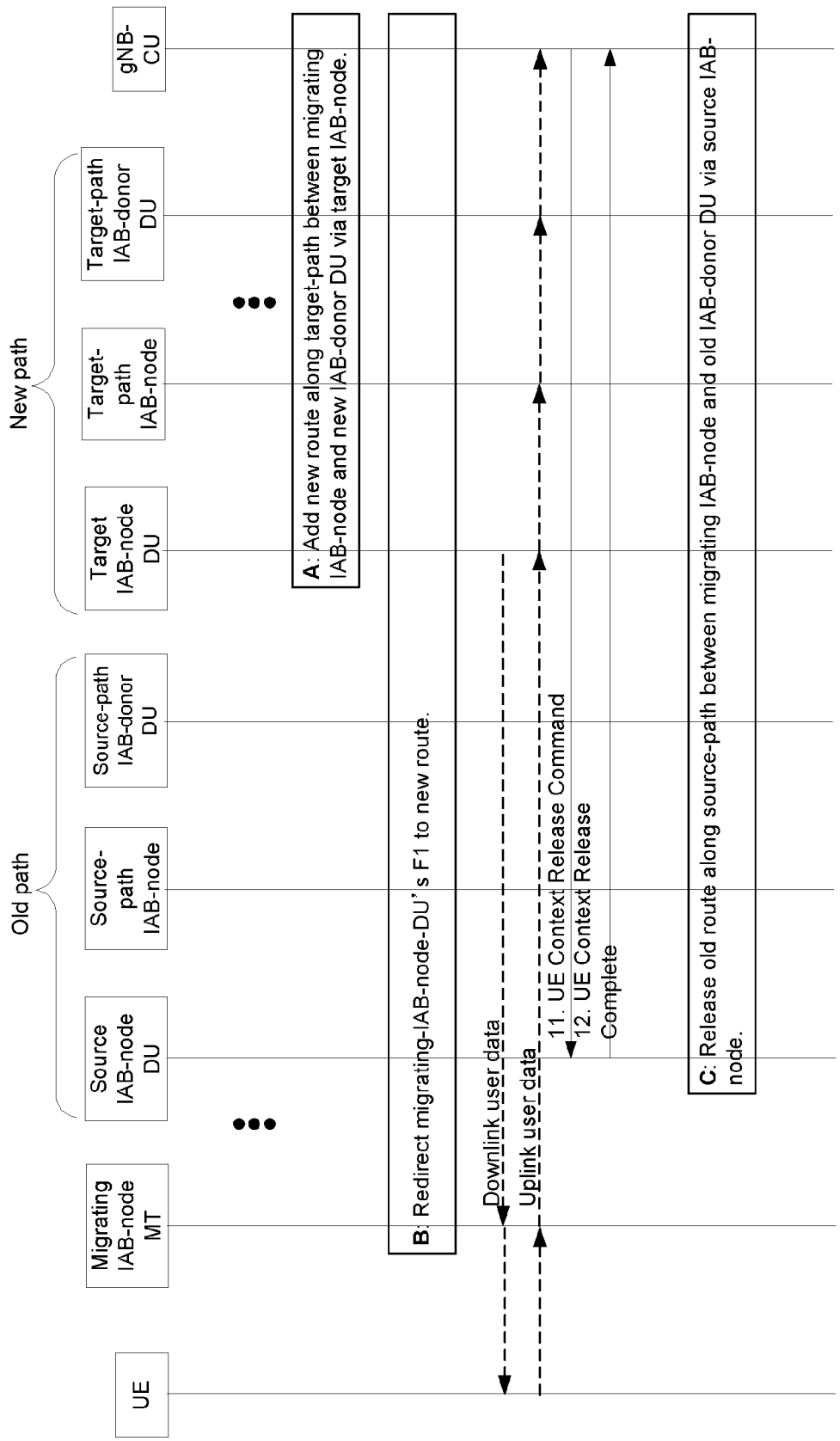

FIGS. 26A and 26B show a procedure for adaptation of ST topology. It is assumed that topology adaptation is initiated by the CU based on measurements reported by the migrating-IAB-node's MT. The CU's topology adaptation decision may include measurements by other IAB-nodes. The measurements may be based on a measurement configuration the IAB-nodes received from the CU before. FIGS. 26A and 26B show the topology adaptation procedure for the migrating IAB-node. In this procedure, the migrating IAB-nodes' MT applies the steps of Inter-gNB-DU mobility as described in TS 38.401 (version 15.2.0) section 8.2.1.1. Additional signalling is supported for route changes of on-path IAB-nodes and on-path IAB-donor DUs.

The procedure contains the following steps:

1. The MT sends a Measurement Report message to the source IAB-node-DU. This report is based on a Measurement Configuration the migrating-IAB-node's MT received from the IAB-donor CU before.

2. The source IAB-node-DU sends an Uplink RRC Transfer message to the gNB-CU to convey the received Measurement Report.

3. The gNB-CU sends an UE Context Setup Request message to the target IAB-node-DU to create an MT context and setup one or more bearers. IAB-specific aspects include that (i) these bearers are used by the MT for its own data and signalling traffic; and (ii) In addition, one or more RLC-channels are established for backhauling.

4. The target IAB-node-DU responds to the gNB-CU with an UE Context Setup Response message.

5. The gNB-CU sends a UE Context Modification Request message to the source IAB-node-DU, which includes a generated RRCConnectionReconfiguration message and indicates to stop the data transmission for the MT.

6. The source IAB-node-DU forwards the received RRCConnectionReconfiguration message to the MT.

7. The source IAB-node-DU responds to the gNB-CU with the UE Context Modification Response message.

8. A Random Access procedure is performed at the target IAB-node-DU.

9. The MT responds to the target IAB-node-DU with an RRCConnectionReconfigurationComplete message.

10. The target IAB-node-DU sends an Uplink RRC Transfer message to the gNB-CU to convey the received RRCConnectionReconfigurationComplete message. Downlink packets are sent to the MT. Also, uplink packets are sent from the MT, which are forwarded to the gNB-CU through the target IAB-node-DU.

For IAB: The gNB-CU configures a new adaptation-layer route on the wireless backhaul between migrating IAB-node and IAB-donor DU via the target IAB-node. It further configures a forwarding entry between the fronthaul on the new route on the wireless backhaul. These configurations may be performed at an earlier stage, e.g. right after step 4. The details of this step depend on the particular UP and CP transport option (see below).

B. For IAB: The gNB-CU redirects all F1-U tunnels for the migrating-IAB-node DU from the old route to the new route. It further redirects F1-C for the migrating-IAB-node DU from the old route to the new route. While step B has to follow step A it may be performed at an earlier stage as described under step A. The details of this step depend on the particular UP and CP transport option (see below).

11. The gNB-CU sends an UE Context Release Command message to the source IAB-node-DU.

12. The source IAB-node-DU releases the MT context and responds the gNB-CU with an UE Context Release Complete message.

C. For IAB: The gNB-CU releases the old adaptation-layer route on the wireless backhaul between migrating IAB-node and IAB-donor DU via the source IAB-node. It further releases the forwarding entry between the fronthaul on the old route on the wireless backhaul. The detailed steps depend on the particular UP and CP transport option (see below).

Figure 27B:
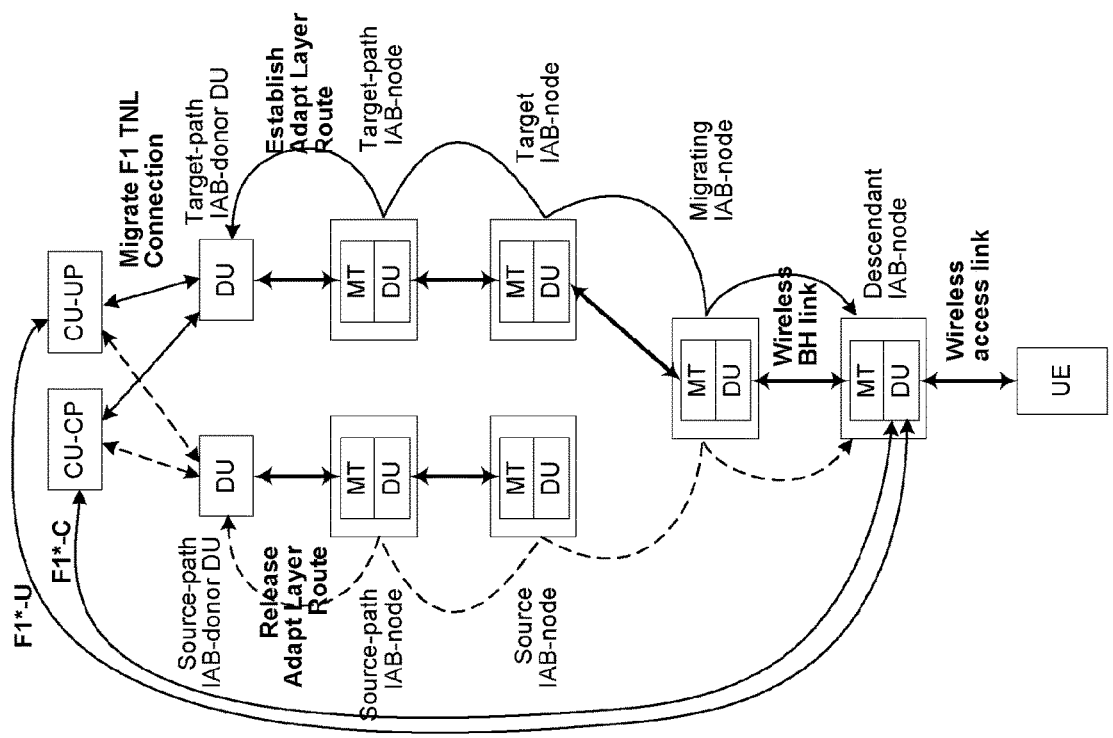
FIG. 27B is a block diagram of an IAB node, which has a descendant IAB node, after migrating from a source IAB node to a target IAB node in a spanning tree topology according to some embodiments.
Figure 27A:
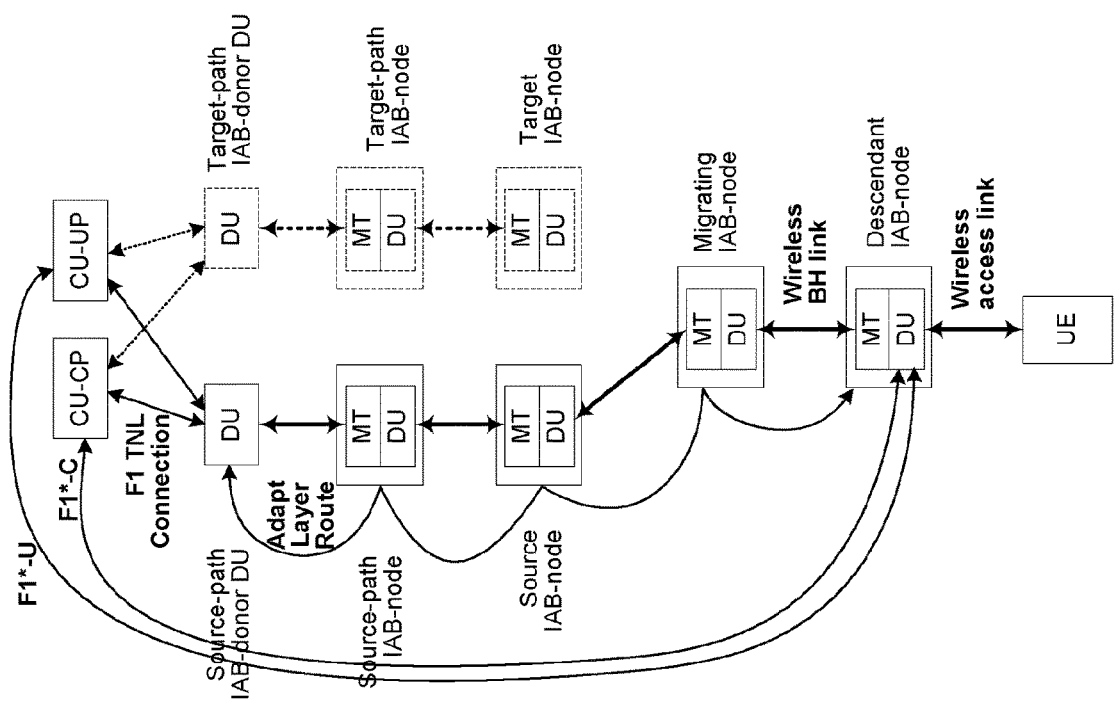
FIG. 27A is a block diagram of an IAB node, which has a descendant IAB node, before migrating from a source IAB node to a target IAB node in a spanning tree topology according to some embodiments.

FIGS. 27A and 27B show topology adaptation in ST where the migrating IAB-node has a descendant IAB-node. The Figures illustrate that the above steps A, B, and C also have to be conducted for all IAB-nodes that are descendant to the migrating IAB-node.

The IAB-related steps A, B and C depend on the particular UP and CP transport option chosen. Some details related to these UP and CP options are provided below.

Consider Step A, the establishment of a new route. Route establishment uses the same procedure as during IAB-node setup. Routing entries need to be configured on at least all IAB nodes that reside on the section of the new path that does not overlap with the old path. In case new routing identifiers are used for the new route, all IAB-nodes on the new path need to be configured. A forwarding entry needs to be configured on the new IAB-donor DU to interconnect the TNL between IAB-donor DU and CU with the new adaptation-layer route between the new IAB-donor DU and the migrating IAB-node. The details of this forwarding entry depend on the identifiers used for routing on the wireless backhaul. In case the migrating IAB-node supports an IP-address on the adaptation layer, which is derived from a fronthaul IP-prefix owned by the IAB-donor DU, the IAB-node needs to obtain a new IP address when the IAB-donor DU changes. The new IP address can be obtained in the same manner as during IAB-node setup. In case end-to-end RLC is supported between UE and IAB-donor DU, IAB-topology adaptation as discussed in this context can be accomplished in the following manner In Option 1, the entire RLC-state is migrated from the old IAB-donor DU to the new IAB-donor DU, which can remain transparent to the UE. In Option 2, the RLCs of all the bearers of all the UEs under the migrating IAB node and the UEs under the descendant IAB nodes of the migrating IAB node are reset and re-established, which is not transparent to the UEs. In case hop-by-hop RLC is supported between UE and IAB-donor DU, IAB-topology adaptation as discussed in this context may lead to data loss for UL traffic. TR 38.874 (version 0.4.0) section 8.2.3 discusses potential remedies.

Consider now Step B, Redirection of F1-U tunnels and F1-AP onto the new route. In case the IAB-donor-DU changes during topology adaptation, the downlink F1-TNL-endpoints have to be reconfigured. The TNL addresses for F1 are either those of the IAB-donor-DU or of the migrating IAB-node. In this latter case, the migrating IAB-node's IP address changes during topology adaptation as discussed under Step A. In case the GTP-U tunnels for the IAB node are terminated at the IAB-donor DU these tunnels need to be moved to the target IAB-donor DU. It is assumed this can be done by allocating new GTP TEIDs when the forwarding is updated in the target IAB-donor DU. In case an F1-AP/SCTP connection between the CU and donor-DU is used to deliver CP message towards the IAB node, the F1-AP/SCTP connection between the CU and the target IAB-donor DU need to be updated to allow forwarding of CP message to the IAB node.

Consider next Step C, Release of old route. Routing entries of the old route are released as long as they are not used for forwarding on the new path. Also, forwarding entries are released on the old IAB-donor DU that interconnect the TNL between IAB-donor DU and CU with the old adaptation-layer route. The details of this forwarding entry depend on the identifiers used for routing on the wireless backhaul.

There currently exist certain challenge(s). As discussed, when an IAB node is handed over to another IAB node (or donor DU), there is a need for the relocation of the transport network layer tunnel endpoints, e.g., the GTP-U tunnel endpoints. One approach would be to use the UE context modification procedure of F1, where it is possible to change the tunnel endpoints of the UP bearers. However, the disadvantage of using this is that one message is required for each UE connected to the IAB node, as well as for each MT of the descendant IAB nodes. This will cause the donor CU sending a large number of messages to the IAB node, which may have to propagate over several hops to reach the IAB node. Doing so will cause not only inefficient air interface resource utilization over the backhaul links, but also will delay the whole handover process, thereby impacting the performance, and possibly causing service interruption, of a multitude of UEs Certain aspects of the present disclosure and their embodiments may provide solutions to these or other challenges. Some embodiments for example provide the possibility to relocate all the tunnel endpoints that are associated with an IAB node when it is relocating from one parent IAB node to another in one "go" (e.g., using a single message or procedure run) rather than using the legacy UE associated tunnel relocation mechanisms (i.e. sending UE Context modification required procedure for every affected UE or MT part of descendent IAB nodes of the relocating IAB node). Some embodiments therefore provide a solution for improving the efficiency in updating TNL information when an IAB node relocates to a new serving IAB node. Alternatively or additionally, some embodiments provide a solution for improving the efficiency in updating TNL information when a CU or DU relocate some or all bearers from one logical unit to another.

The mechanisms are also reusable for a non IAB scenario where we have a CU-DU split, and the CU or/and the DU could have several logical units that could employ different IP addresses and the CU and/or DU can switch off and on one or several of these units for different reasons such as power saving, load balancing, maintenance, etc.

Certain embodiments may provide one or more of the following technical advantage(s). Some embodiments enable the relocation of the TNL endpoints of UP traffic when an IAB node relocates. This is done efficiently via a single message rather than a multitude of messages that are sent on behalf of each affected UE.

The methods can also be reused in a non IAB scenario (i.e. normal CU-DU split), where the CU or DU wants to move some or all of bearers from one logical unit to another (for example, for power savings, due to failure, etc.). This also prevents the need to send multiple messages on the F1 interface for the sake of each affected UE.

Embodiment 1 includes the following explicit communication mechanism between the IAB node (the DU part) and the CU, by enhancing the F1 network interface.

In Embodiment 1a, new IEs are added in the GNB-DU configuration update procedure e.g., Old TNL address IE and New TNL Address IE. These IEs inform the receiving node (CU) that the TNL address part of the TNL information for all the data radio bearers (DRBs) using Old TNL Address need to be replaced with New TNL Address IE. In alternative Embodiment 1b, new IEs are added in the GNB-DU configuration update procedure e.g., Old TNL Information IE and New TNL Information IE, corresponding to each affected bearer.

Embodiment 1c and d are the same as embodiment 1a and 1b, except that a new F1 message is introduced to communicate the update.

When the CU receives the message according to any of embodiments 1a to 1d, it updates all the DL GTP tunnel endpoints (associated with IAB node that sent the configuration update message) using the new TNL Information IE (e.g. the IP address is changed for all DL GTP tunnels in the case of 1a/1b, while the IP address as well as the TEID is changed for all DL GTP tunnels in the case of 1c/1d). In case the CU is split in a CU-CP and CU-UP parts, this could include the CU-CP sending one or more messages to one or more CU-UP parts to update the tunnels.

Embodiment 2 includes the following implicit handling of the relocation of the tunnel endpoints between the IAB node (DU part) and the CU, by employing an enhancement of the F1 interface communication between the donor DU and CU. When the IP address of the IAB node changes due to relocation/handover to a new serving IAB node, the donor DU notifies the donor CU about the change, including the new and old IP addresses (and may also include the identity of the affected IAB node). This can be as part of the GNB-DU configuration update procedure, or a new F1 message is introduced for that purpose. When the CU gets this message, it will update the TNL information of all bearers that were being served via the IAB node that just relocated (i.e. it will change the TNL address of their TN information IE to the new IP address).

In case the IAB node's donor DU changes (but the donor CU remains the same), the donor CU can receive the update of the IP address either from the old or the new donor DU. In case the IAB node's donor CU changes during relocation, communication between the two CU's is required (i.e. context transfer of the IAB node from the old CU to the new CU). When the new CU receives the IAB's context, it will update the DL Tunnels from the old IP to the new IP.

Embodiment 3 include the following implicit handling of the relocation of the tunnel endpoints between the IAB node (DU part) and the CU, where the IP address is assigned by the donor CU. When the IP address of the IAB node changes due to relocation/handover to a new serving IAB node, the donor CU will update the TNL information of all bearers that were being served via the IAB node that just relocated (i.e. it will change the TNL address of their TNL information IE to the new IP address.) In case the IAB node's donor CU changes during relocation, communication between the two CUs is required (i.e. context transfer of the IAB node from the old CU to the new CU). When the new CU receives the IAB's context, it will update the DL Tunnels from the old IP to the new IP.

In Embodiment 4, in case the IAB node is associated with multiple IP or TNL addresses, it can include mapping information to the CU (as described in other embodiments) where one or more old IP/TNL address are mapped to one or more new IP/TNL. For example: (i) Old IP1 is mapped to new IP1, Old IP2 is mapped to new IP2; (ii) Or, Old IP1 and Old IP2 are mapped to new IP1; iii) Or, Old IP1 is mapped to new IP1 and IP2. In this latter case, the IAB node could indicate which specific flows (or GTP tunnels) should be mapped to which IP address IP1 or IP2. E.g. GTP tunnel X should be mapped to IP1, and GTP tunnel Y should be mapped to IP2. The mapping could also be implicit. E.g. if only 1 new IP is provided, then all existing GTP tunnels are mapped to that IP.

The previous embodiments were all focused on the IAB handover scenario. However, the mechanisms in Embodiment 5 are applicable to a non-IAB scenario where a CU-DU split is involved. In this case, the DU may have several logical units that could employ different IP addresses and it may switch off and on one or several of these units for different reasons, such as power saving, load balancing, maintenance, etc. If that happens, the same mechanisms above could be reused to communicate the change of the IP address and thereby trigger the tunnel remapping. Specially, Embodiment 1, 3, and/or 4 can be reused as-is, where in this case instead of the IAB node, it will be a normal DU performing the communication of the updated information to the CU. Or Embodiment 2 may be slightly adapted because in Embodiment 2 it was the donor DU communicating information about the IAB node to the CU. For the generic CU-DU case, Embodiment 2 is basically the same as Embodiment 1.

Not only that, the mechanism can be also applied in case it is the CU that is changing the IP address. The only difference in this case will be the CU sending the updated information to the DU (via an enhanced gNB-CU configuration update or a new message defined for that purpose).

In embodiment 5, as in the earlier embodiments, either just the old and new IP addresses, or the TNL information of each and every affected tunnel could be provided. The provision of just the IP addresses is very efficient, but it might not always be possible in this case because one particular difference between Embodiment 5 and the previous embodiments is that in the case of Embodiment 5, relocation may be towards an IP address that might be already serving other bearers and those bearers might be using the same TEID values as the bearers that are being relocated.

For instance, if these were some of the DL tunnel endpoints from the CU to the DU for some bearers: (IP1, TEIDa), (IP1, TEIDb), (IP2, TEIDx), (IP2, TEIDy); and DU wants to switch off the logical unit that has IP2 and just communicates this information, the tunnel relocation will result in the DL tunnel end of the affected bearers that were associated with IP1 will become (IP2, TEIDa), (IP2, TEIDb), (IP2, TEIDx), (IP2, TEIDy). If, for example, TEIDa=TEIDx, we will end up with an erroneous scenario where we have the same DL tunnel endpoint for different bearers (i.e. for original bearer that was using (IP1,TEIDa) and the new bearer that was relocated from IP2).

One mechanism to avoid such problem is to send a shift value together with the updated IP addresses, where the provided shift value can be used to update the associated TEIDs as well: i.e the new tunnel endpoints for the relocated bearers will be (IP2, TEIDx+shift), (IP2, TEIDy+shift), etc.

Some example realization of the required message structures for some of the embodiments is shown below.

Figure 28:
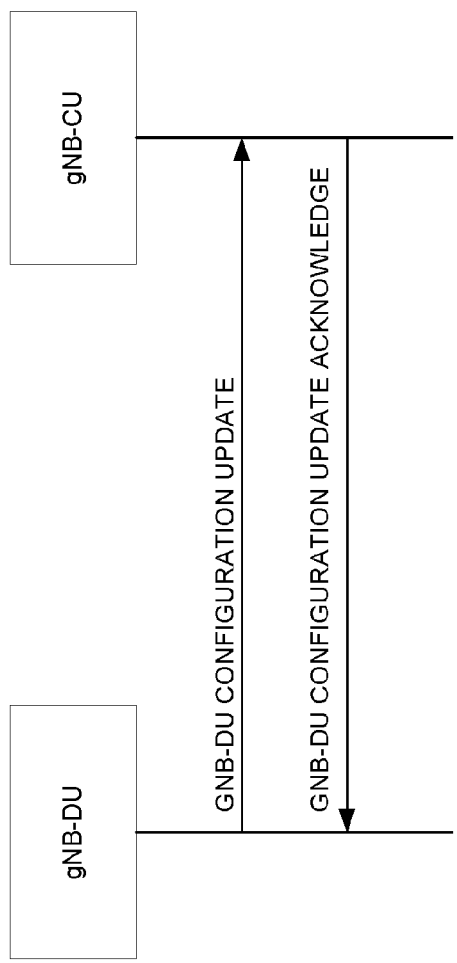
FIG. 28 is a call flow diagram of a gNB DU configuration update procedure according to some embodiments.

FIG. 28 shows successful operation of a gNB-DU Configuration Update procedure. The purpose of the is to update application level configuration data needed for the gNB-DU and the gNB-CU to interoperate correctly on the F1 interface. This procedure does not affect existing UE-related contexts, if any. The procedure uses non-UE associated signalling.

As shown, the gNB-DU initiates the procedure by sending a GNB-DU CONFIGURATION UPDATE message to the gNB-CU including an appropriate set of updated configuration data that it has just taken into operational use. The gNB-CU responds with GNB-DU CONFIGURATION UPDATE ACKNOWLEDGE message to acknowledge that it successfully updated the configuration data.

The updated configuration data shall be stored in both nodes and used as long as there is an operational TNL association or until any further update is performed.

In Embodiment 1a, the F1-AP GNB-DU configuration update message is shown below, e.g., as one example of the message 15 in FIG. 1. The message in particular includes an Update TNL Address List, which is a list of TNL addresses of the gNB-DU to update as a result of the relocation.

| IE/Group Name | Presence | Range | IE type and reference | Semantics description |
|---|---|---|---|---|
| Message Type | | | 9.3.1.1 | |
| Transaction ID | | | 9.3.1.23 | |
| Served Cells To Add List | 0..1 | | | Complete list of added cells served by the gNB-DU |
| >Served Cells To Add Item | | 1 .. <maxCellingNBDU> | | |
| >>Served Cell Information | | | 9.3.1.10 | Information about the cells configured in the gNB-DU |
| >>gNB-DU System Information | | | 9.3.1.18 | RRC container with system information owned by gNB-DU |
| Served Cells To Modify List | 0..1 | | | Complete list of modified cells served by the gNB-DU |
| >Served Cells To Modify Item | | 1 .. <maxCellingNBDU> | | |
| >>Old NR CGI | | | 9.3.1.12 | |
| >>Served Cell Information | | | 9.3.1.10 | Information about the cells configured in the gNB-DU |
| >>gNB-DU System Information | | | 9.3.1.18 | RRC container with system information owned by gNB-DU |
| Served Cells To Delete List | 0..1 | | | Complete list of deleted cells served by the gNB-DU |
| >Served Cells To Delete Item | | 1.. <maxCellingNBDU> | | |
| >>Old NR CGI | | | 9.3.1.12 | |
| Active Cells List | 0..1 | | | Complete list of active cells |
| >Active Cells Item | | 0 .. <maxCellingNBDU> | | |
| >> NR CGI | | | 9.3.1.12 | |
| Update TNL Address List | | | | |
| >Old TNL Address | | 0.. <maxnoofTNL AddressToUpdate> | | |
| | | | 9.3.2.3 | transport layer address of the gNB-DU before relocation |

| IE/Group Name | resence | Range | IE type and reference | Semantics description |
|---|---|---|---|---|
| >New TNL Address | | | 9.3.2.3 | transport layer address of the gNB-DU after relocation |

In another Embodiment 1b, the F1-AP GNB-DU configuration update message is shown below, e.g., as another example of the message 15 in FIG. 1. The message in particular includes an Update TNL Address List, which is a list of TNL information of the gNB-DU to update as a result of the relocation.

| IE/Group Name | resence | Range | IE type and reference | Semantics description |
|---|---|---|---|---|
| Message Type | | | 9.3.1.1 | |
| Transaction ID | | | 9.3.1.23 | |
| Served Cells To Add List | | 0..1 | | Complete list of added cells served by the gNB-DU |
| >Served Cells To Add Item | | 1 .. <maxCellingNBDU> | | |
| >>Served Cell Information | | | 9.3.1.10 | Information about the cells configured in the gNB-DU |
| >>gNB-DU System Information | | | 9.3.1.18 | RRC container with system information owned by gNB-DU |
| Served Cells To Modify List | | 0..1 | | Complete list of modified cells served by the gNB-DU |
| >Served Cells To Modify Item | | 1 .. <maxCellingNBDU> | | |
| >>Old NR CGI | | | 9.3.1.12 | |
| >>Served Cell Information | | | 9.3.1.10 | Information about the cells configured in the gNB-DU |
| >>gNB-DU System Information | | | 9.3.1.18 | RRC container with system information owned by gNB-DU |
| Served Cells To Delete List | | 0..1 | | Complete list of deleted cells served by the gNB-DU |
| >Served Cells To Delete Item | | 1.. <maxCellingNBDU> | | |
| >>Old NR CGI | | | 9.3.1.12 | |
| Active Cells List | | 0..1 | | Complete list of active cells |
| >Active Cells Item | | 0 .. <maxCellingNBDU> | | |
| >> NR CGI | | | 9.3.1.12 | |
| Update TNL Address List | | 0 .. <maxnoofTNL AddressTo Update> | | |
| >Old TNL INFO | | | 9.3.2.1 | Old UP TNL info |
| >New TNL INFO | | | 9.3.2.1 | New UP TNL info |

In yet another Embodiment 1c, a new message is shown below, e.g., as another example of the message 15 in FIG. 1. The message in particular includes an Update TNL Address List, which is a list of TNL addresses of the gNB-DU to update as a result of the relocation.

| IE/Group Name | Presence | Range | IE type and reference | Semantics description |
|---|---|---|---|---|
| Message Type | M | | 9.3.1.1 | |
| Transaction ID | M | | 9.3.1.23 | |
| Update TNL Address List | | 0.. <maxnoofTNL AddressToUpdate> | | |
| >Old TNL Address | | | 9.3.2.3 | transport layer address of the gNB-DU before relocation |
| >New TNL Address | | | 9.3.2.3 | transport layer address of the gNB-DU after relocation |

In still another Embodiment 1d, a new message is shown below, e.g., as another example of the message 15 in FIG. 1. The message in particular includes an Update TNL Address List, which is a list of TNL information of the gNB-DU to update as a result of the relocation.

| IE/Group Name | resence | Range | IE type and reference | Semantics description |
|---|---|---|---|---|
| Message Type | | | 9.3.1.1 | |
| Transaction ID | | | 9.3.1.23 | |
| Update TNL Address List | | 0 .. <maxnoofTNL AddressToUpdate> | | |
| >Old TNL INFO | | | 9.3.2.1 | Old UP TNL info |
| >New TNL INFO | | | 9.3.2.1 | New UP TNL info |

These, or any other embodiment of the message 15 in FIG. 1, may be transmitted for instance at any time after step 6 in FIGS. 26A-26B.

Additional embodiments will now be described below, at times with reference to a network node or base station. In this case, the network node or base station may be an IAB node or IAB donor as described above and/or may be split into a CU and DU as described above.

Figure 29:
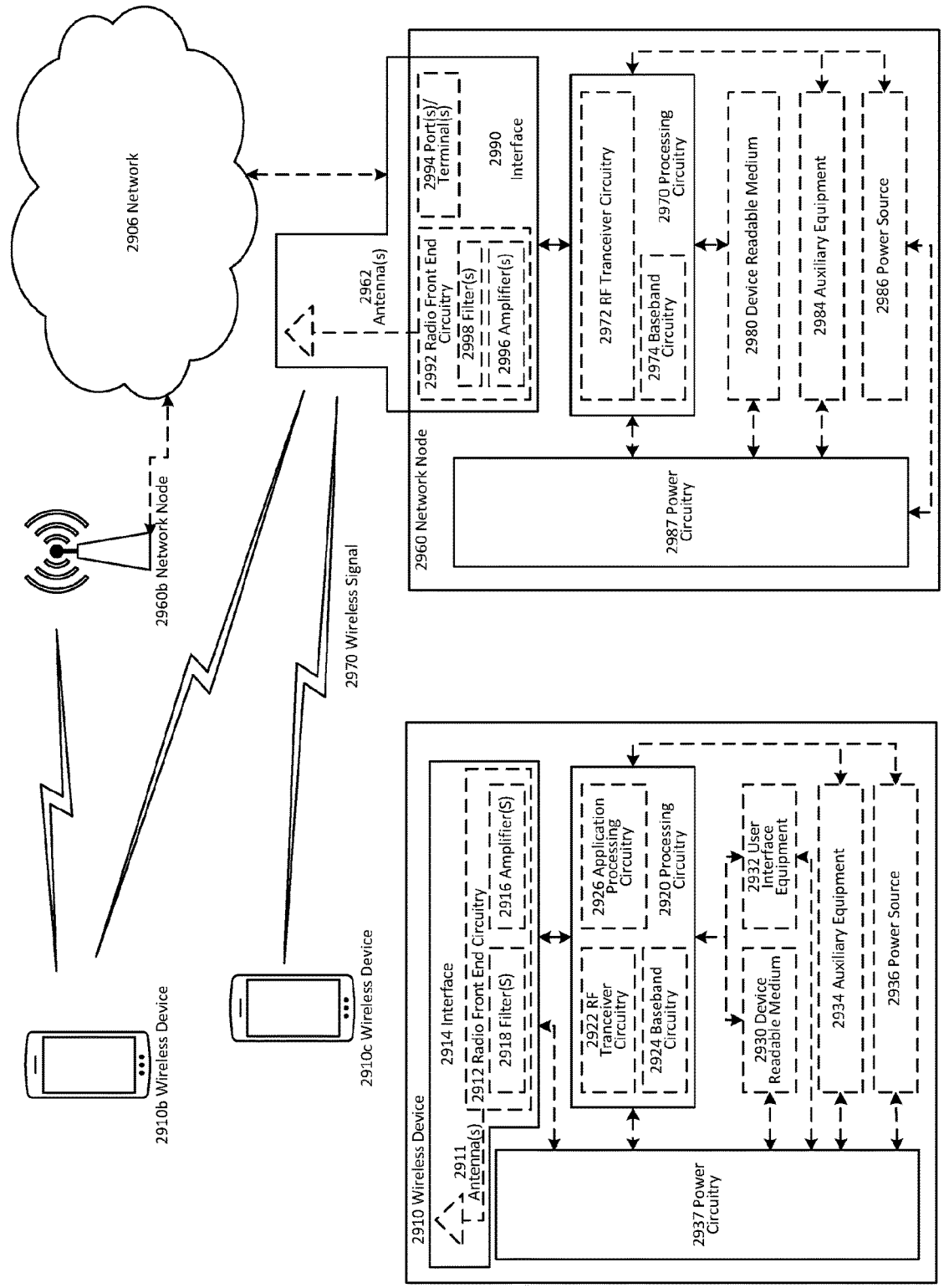
FIG. 29 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 29. For simplicity, the wireless network of FIG. 29 only depicts network 2906, network nodes 2960 and 2960b, and WDs 2910, 2910b, and 2910c. In practice, a wireless network may further include any additional elements suitable to support communication between wireless devices or between a wireless device and another communication device, such as a landline telephone, a service provider, or any other network node or end device. Of the illustrated components, network node 2960 and wireless device (WD) 2910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2960 and WD 2910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 29, network node 2960 includes processing circuitry 2970, device readable medium 2980, interface 2990, auxiliary equipment 2984, power source 2986, power circuitry 2987, and antenna 2962. Although network node 2960 illustrated in the example wireless network of FIG. 29 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 2960 are depicted as single boxes located within a larger box, or nested within multiple boxes, in practice, a network node may comprise multiple different physical components that make up a single illustrated component (e.g., device readable medium 2980 may comprise multiple separate hard drives as well as multiple RAM modules).

Similarly, network node 2960 may be composed of multiple physically separate components (e.g., a NodeB component and a RNC component, or a BTS component and a BSC component, etc.), which may each have their own respective components. In certain scenarios in which network node 2960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 2960 may be configured to support multiple radio access technologies (RATs). In such embodiments, some components may be duplicated (e.g., separate device readable medium 2980 for the different RATs) and some components may be reused (e.g., the same antenna 2962 may be shared by the RATs). Network node 2960 may also include multiple sets of the various illustrated components for different wireless technologies integrated into network node 2960, such as, for example, GSM, WCDMA, LTE, NR, WiFi, or Bluetooth wireless technologies. These wireless technologies may be integrated into the same or different chip or set of chips and other components within network node 2960.

Processing circuitry 2970 is configured to perform any determining, calculating, or similar operations (e.g., certain obtaining operations) described herein as being provided by a network node. These operations performed by processing circuitry 2970 may include processing information obtained by processing circuitry 2970 by, for example, converting the obtained information into other information, comparing the obtained information or converted information to information stored in the network node, and/or performing one or more operations based on the obtained information or converted information, and as a result of said processing making a determination.

Processing circuitry 2970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2960 components, such as device readable medium 2980, network node 2960 functionality. For example, processing circuitry 2970 may execute instructions stored in device readable medium 2980 or in memory within processing circuitry 2970. Such functionality may include providing any of the various wireless features, functions, or benefits discussed herein. In some embodiments, processing circuitry 2970 may include a system on a chip (SOC).

In some embodiments, processing circuitry 2970 may include one or more of radio frequency (RF) transceiver circuitry 2972 and baseband processing circuitry 2974. In some embodiments, radio frequency (RF) transceiver circuitry 2972 and baseband processing circuitry 2974 may be on separate chips (or sets of chips), boards, or units, such as radio units and digital units. In alternative embodiments, part or all of RF transceiver circuitry 2972 and baseband processing circuitry 2974 may be on the same chip or set of chips, boards, or units In certain embodiments, some or all of the functionality described herein as being provided by a network node, base station, eNB or other such network device may be performed by processing circuitry 2970 executing instructions stored on device readable medium 2980 or memory within processing circuitry 2970. In alternative embodiments, some or all of the functionality may be provided by processing circuitry 2970 without executing instructions stored on a separate or discrete device readable medium, such as in a hard-wired manner In any of those embodiments, whether executing instructions stored on a device readable storage medium or not, processing circuitry 2970 can be configured to perform the described functionality. The benefits provided by such functionality are not limited to processing circuitry 2970 alone or to other components of network node 2960, but are enjoyed by network node 2960 as a whole, and/or by end users and the wireless network generally.

Device readable medium 2980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 2970. Device readable medium 2980 may store any suitable instructions, data or information, including a computer program, software, an application including one or more of logic, rules, code, tables, etc. and/or other instructions capable of being executed by processing circuitry 2970 and, utilized by network node 2960. Device readable medium 2980 may be used to store any calculations made by processing circuitry 2970 and/or any data received via interface 2990. In some embodiments, processing circuitry 2970 and device readable medium 2980 may be considered to be integrated.

Interface 2990 is used in the wired or wireless communication of signalling and/or data between network node 2960, network 2906, and/or WDs 2910. As illustrated, interface 2990 comprises port(s)/terminal(s) 2994 to send and receive data, for example to and from network 2906 over a wired connection. Interface 2990 also includes radio front end circuitry 2992 that may be coupled to, or in certain embodiments a part of, antenna 2962. Radio front end circuitry 2992 comprises filters 2998 and amplifiers 2996. Radio front end circuitry 2992 may be connected to antenna 2962 and processing circuitry 2970. Radio front end circuitry may be configured to condition signals communicated between antenna 2962 and processing circuitry 2970. Radio front end circuitry 2992 may receive digital data that is to be sent out to other network nodes or WDs via a wireless connection. Radio front end circuitry 2992 may convert the digital data into a radio signal having the appropriate channel and bandwidth parameters using a combination of filters 2998 and/or amplifiers 2996. The radio signal may then be transmitted via antenna 2962. Similarly, when receiving data, antenna 2962 may collect radio signals which are then converted into digital data by radio front end circuitry 2992. The digital data may be passed to processing circuitry 2970. In other embodiments, the interface may comprise different components and/or different combinations of components.

In certain alternative embodiments, network node 2960 may not include separate radio front end circuitry 2992, instead, processing circuitry 2970 may comprise radio front end circuitry and may be connected to antenna 2962 without separate radio front end circuitry 2992. Similarly, in some embodiments, all or some of RF transceiver circuitry 2972 may be considered a part of interface 2990. In still other embodiments, interface 2990 may include one or more ports or terminals 2994, radio front end circuitry 2992, and RF transceiver circuitry 2972, as part of a radio unit (not shown), and interface 2990 may communicate with baseband processing circuitry 2974, which is part of a digital unit (not shown).

Antenna 2962 may include one or more antennas, or antenna arrays, configured to send and/or receive wireless signals. Antenna 2962 may be coupled to radio front end circuitry 2990 and may be any type of antenna capable of transmitting and receiving data and/or signals wirelessly. In some embodiments, antenna 2962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 2962 may be separate from network node 2960 and may be connectable to network node 2960 through an interface or port.

Antenna 2962, interface 2990, and/or processing circuitry 2970 may be configured to perform any receiving operations and/or certain obtaining operations described herein as being performed by a network node. Any information, data and/or signals may be received from a wireless device, another network node and/or any other network equipment. Similarly, antenna 2962, interface 2990, and/or processing circuitry 2970 may be configured to perform any transmitting operations described herein as being performed by a network node. Any information, data and/or signals may be transmitted to a wireless device, another network node and/or any other network equipment.

Power circuitry 2987 may comprise, or be coupled to, power management circuitry and is configured to supply the components of network node 2960 with power for performing the functionality described herein. Power circuitry 2987 may receive power from power source 2986. Power source 2986 and/or power circuitry 2987 may be configured to provide power to the various components of network node 2960 in a form suitable for the respective components (e.g., at a voltage and current level needed for each respective component). Power source 2986 may either be included in, or external to, power circuitry 2987 and/or network node 2960. For example, network node 2960 may be connectable to an external power source (e.g., an electricity outlet) via an input circuitry or interface such as an electrical cable, whereby the external power source supplies power to power circuitry 2987. As a further example, power source 2986 may comprise a source of power in the form of a battery or battery pack which is connected to, or integrated in, power circuitry 2987. The battery may provide backup power should the external power source fail. Other types of power sources, such as photovoltaic devices, may also be used.

Alternative embodiments of network node 2960 may include additional components beyond those shown in FIG. 29 that may be responsible for providing certain aspects of the network node's functionality, including any of the functionality described herein and/or any functionality necessary to support the subject matter described herein. For example, network node 2960 may include user interface equipment to allow input of information into network node 2960 and to allow output of information from network node 2960. This may allow a user to perform diagnostic, maintenance, repair, and other administrative functions for network node 2960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 2910 includes antenna 2911, interface 2914, processing circuitry 2920, device readable medium 2930, user interface equipment 2932, auxiliary equipment 2934, power source 2936 and power circuitry 2937. WD 2910 may include multiple sets of one or more of the illustrated components for different wireless technologies supported by WD 2910, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 2910.

Antenna 2911 may include one or more antennas or antenna arrays, configured to send and/or receive wireless signals, and is connected to interface 2914. In certain alternative embodiments, antenna 2911 may be separate from WD 2910 and be connectable to WD 2910 through an interface or port. Antenna 2911, interface 2914, and/or processing circuitry 2920 may be configured to perform any receiving or transmitting operations described herein as being performed by a WD. Any information, data and/or signals may be received from a network node and/or another WD. In some embodiments, radio front end circuitry and/or antenna 2911 may be considered an interface.

As illustrated, interface 2914 comprises radio front end circuitry 2912 and antenna 2911. Radio front end circuitry 2912 comprise one or more filters 2918 and amplifiers 2916. Radio front end circuitry 2914 is connected to antenna 2911 and processing circuitry 2920, and is configured to condition signals communicated between antenna 2911 and processing circuitry 2920. Radio front end circuitry 2912 may be coupled to or a part of antenna 2911. In some embodiments, WD 2910 may not include separate radio front end circuitry 2912; rather, processing circuitry 2920 may comprise radio front end circuitry and may be connected to antenna 2911. Similarly, in some embodiments, some or all of RF transceiver circuitry 2922 may be considered a part of interface

2914. Radio front end circuitry 2912 may receive digital data that is to be sent out to other network nodes or WDs via a wireless connection. Radio front end circuitry 2912 may convert the digital data into a radio signal having the appropriate channel and bandwidth parameters using a combination of filters 2918 and/or amplifiers 2916. The radio signal may then be transmitted via antenna 2911. Similarly, when receiving data, antenna 2911 may collect radio signals which are then converted into digital data by radio front end circuitry 2912. The digital data may be passed to processing circuitry 2920. In other embodiments, the interface may comprise different components and/or different combinations of components.

Processing circuitry 2920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2910 components, such as device readable medium 2930, WD 2910 functionality. Such functionality may include providing any of the various wireless features or benefits discussed herein. For example, processing circuitry 2920 may execute instructions stored in device readable medium 2930 or in memory within processing circuitry 2920 to provide the functionality disclosed herein.

As illustrated, processing circuitry 2920 includes one or more of RF transceiver circuitry 2922, baseband processing circuitry 2924, and application processing circuitry 2926. In other embodiments, the processing circuitry may comprise different components and/or different combinations of components. In certain embodiments processing circuitry 2920 of WD 2910 may comprise a SOC. In some embodiments, RF transceiver circuitry 2922, baseband processing circuitry 2924, and application processing circuitry 2926 may be on separate chips or sets of chips. In alternative embodiments, part or all of baseband processing circuitry 2924 and application processing circuitry 2926 may be combined into one chip or set of chips, and RF transceiver circuitry 2922 may be on a separate chip or set of chips. In still alternative embodiments, part or all of RF transceiver circuitry 2922 and baseband processing circuitry 2924 may be on the same chip or set of chips, and application processing circuitry 2926 may be on a separate chip or set of chips. In yet other alternative embodiments, part or all of RF transceiver circuitry 2922, baseband processing circuitry 2924, and application processing circuitry 2926 may be combined in the same chip or set of chips. In some embodiments, RF transceiver circuitry 2922 may be a part of interface 2914. RF transceiver circuitry 2922 may condition RF signals for processing circuitry 2920.

In certain embodiments, some or all of the functionality described herein as being performed by a WD may be provided by processing circuitry 2920 executing instructions stored on device readable medium 2930, which in certain embodiments may be a computer-readable storage medium. In alternative embodiments, some or all of the functionality may be provided by processing circuitry 2920 without executing instructions stored on a separate or discrete device readable storage medium, such as in a hard-wired manner In any of those particular embodiments, whether executing instructions stored on a device readable storage medium or not, processing circuitry 2920 can be configured to perform the described functionality. The benefits provided by such functionality are not limited to processing circuitry 2920 alone or to other components of WD 2910, but are enjoyed by WD 2910 as a whole, and/or by end users and the wireless network generally.

Processing circuitry 2920 may be configured to perform any determining, calculating, or similar operations (e.g., certain obtaining operations) described herein as being performed by a WD. These operations, as performed by processing circuitry 2920, may include processing information obtained by processing circuitry 2920 by, for example, converting the obtained information into other information, comparing the obtained information or converted information to information stored by WD 2910, and/or performing one or more operations based on the obtained information or converted information, and as a result of said processing making a determination.

Device readable medium 2930 may be operable to store a computer program, software, an application including one or more of logic, rules, code, tables, etc. and/or other instructions capable of being executed by processing circuitry 2920. Device readable medium 2930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 2920. In some embodiments, processing circuitry 2920 and device readable medium 2930 may be considered to be integrated.

User interface equipment 2932 may provide components that allow for a human user to interact with WD 2910. Such interaction may be of many forms, such as visual, audial, tactile, etc. User interface equipment 2932 may be operable to produce output to the user and to allow the user to provide input to WD 2910. The type of interaction may vary depending on the type of user interface equipment 2932 installed in WD 2910. For example, if WD 2910 is a smart phone, the interaction may be via a touch screen; if WD 2910 is a smart meter, the interaction may be through a screen that provides usage (e.g., the number of gallons used) or a speaker that provides an audible alert (e.g., if smoke is detected). User interface equipment 2932 may include input interfaces, devices and circuits, and output interfaces, devices and circuits. User interface equipment 2932 is configured to allow input of information into WD 2910, and is connected to processing circuitry 2920 to allow processing circuitry 2920 to process the input information. User interface equipment 2932 may include, for example, a microphone, a proximity or other sensor, keys/buttons, a touch display, one or more cameras, a USB port, or other input circuitry. User interface equipment 2932 is also configured to allow output of information from WD 2910, and to allow processing circuitry 2920 to output information from WD 2910. User interface equipment 2932 may include, for example, a speaker, a display, vibrating circuitry, a USB port, a headphone interface, or other output circuitry. Using one or more input and output interfaces, devices, and circuits, of user interface equipment 2932, WD 2910 may communicate with end users and/or the wireless network, and allow them to benefit from the functionality described herein.

Auxiliary equipment 2934 is operable to provide more specific functionality which may not be generally performed by WDs. This may comprise specialized sensors for doing measurements for various purposes, interfaces for additional types of communication such as wired communications etc.

The inclusion and type of components of auxiliary equipment 2934 may vary depending on the embodiment and/or scenario.

Power source 2936 may, in some embodiments, be in the form of a battery or battery pack. Other types of power sources, such as an external power source (e.g., an electricity outlet), photovoltaic devices or power cells, may also be used. WD 2910 may further comprise power circuitry 2937 for delivering power from power source 2936 to the various parts of WD 2910 which need power from power source 2936 to carry out any functionality described or indicated herein. Power circuitry 2937 may in certain embodiments comprise power management circuitry. Power circuitry 2937 may additionally or alternatively be operable to receive power from an external power source; in which case WD 2910 may be connectable to the external power source (such as an electricity outlet) via input circuitry or an interface such as an electrical power cable. Power circuitry 2937 may also in certain embodiments be operable to deliver power from an external power source to power source 2936. This may be, for example, for the charging of power source 2936. Power circuitry 2937 may perform any formatting, converting, or other modification to the power from power source 2936 to make the power suitable for the respective components of WD 2910 to which power is supplied.

Figure 30:
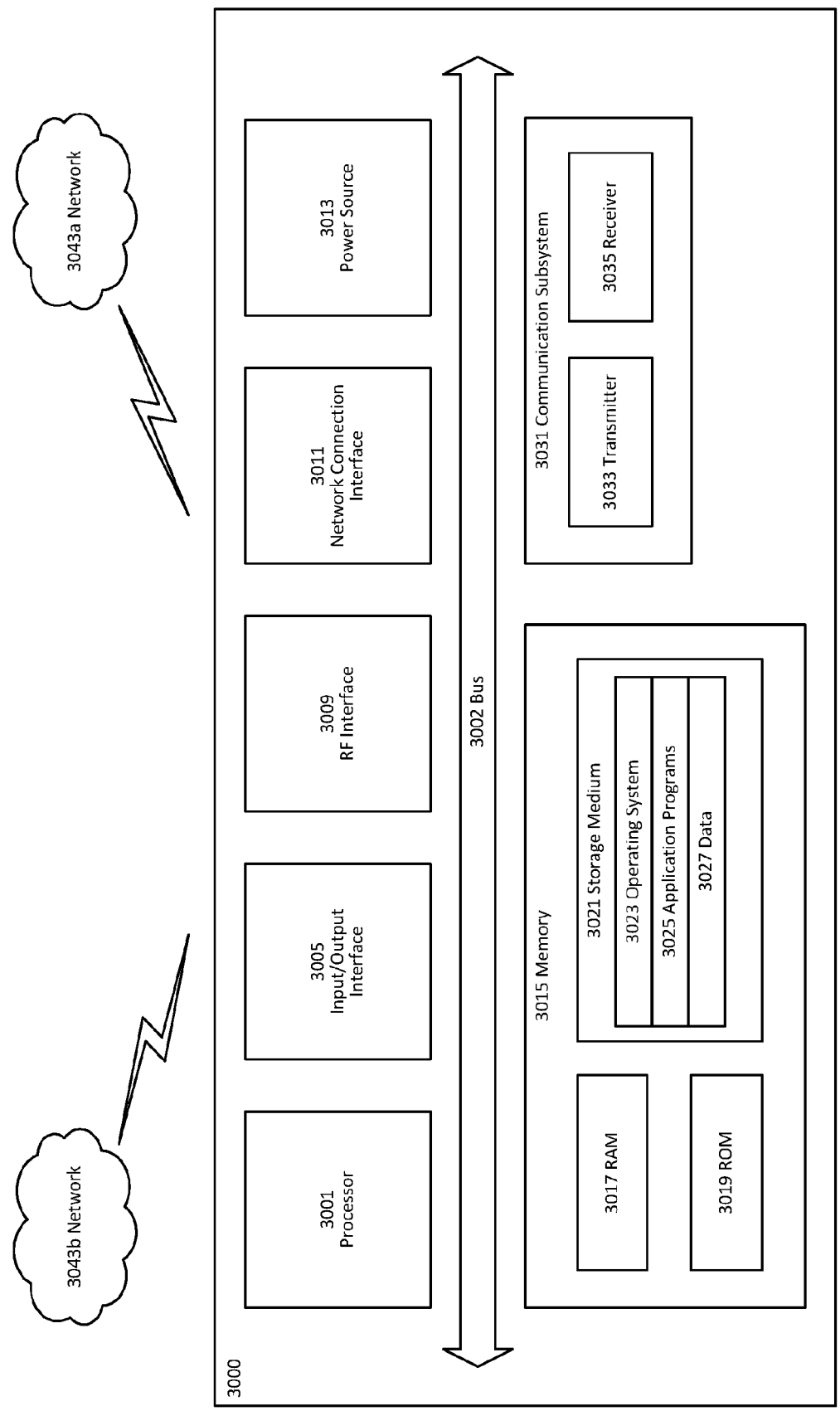
FIG. 30 is a block diagram of a user equipment according to some embodiments.

FIG. 30 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 30200 may be any UE identified by the $3^{rd}$ Generation Partnership Project (3GPP), including a NB-IoT UE, a machine type communication (MTC) UE, and/or an enhanced MTC (eMTC) UE. UE 3000, as illustrated in FIG. 30, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 30 is a UE, the components discussed herein are equally applicable to a WD, and vice-versa.

In FIG. 30, UE 3000 includes processing circuitry 3001 that is operatively coupled to input/output interface 3005, radio frequency (RF) interface 3009, network connection interface 3011, memory 3015 including random access memory (RAM) 3017, read-only memory (ROM) 3019, and storage medium 3021 or the like, communication subsystem 3031, power source 3033, and/or any other component, or any combination thereof. Storage medium 3021 includes operating system 3023, application program 3025, and data 3027. In other embodiments, storage medium 3021 may include other similar types of information. Certain UEs may utilize all of the components shown in FIG. 30, or only a subset of the components. The level of integration between the components may vary from one UE to another UE. Further, certain UEs may contain multiple instances of a component, such as multiple processors, memories, transceivers, transmitters, receivers, etc.

In FIG. 30, processing circuitry 3001 may be configured to process computer instructions and data. Processing circuitry 3001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 3001 may include two central processing units (CPUs). Data may be information in a form suitable for use by a computer.

In the depicted embodiment, input/output interface 3005 may be configured to provide a communication interface to an input device, output device, or input and output device. UE 3000 may be configured to use an output device via input/output interface 3005. An output device may use the same type of interface port as an input device. For example, a USB port may be used to provide input to and output from UE 3000. The output device may be a speaker, a sound card, a video card, a display, a monitor, a printer, an actuator, an emitter, a smartcard, another output device, or any combination thereof. UE 3000 may be configured to use an input device via input/output interface 3005 to allow a user to capture information into UE 3000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 30, RF interface 3009 may be configured to provide a communication interface to RF components such as a transmitter, a receiver, and an antenna. Network connection interface 3011 may be configured to provide a communication interface to network 3043a. Network 3043a may encompass wired and/or wireless networks such as a local-area network (LAN), a wide-area network (WAN), a computer network, a wireless network, a telecommunications network, another like network or any combination thereof. For example, network 3043a may comprise a Wi-Fi network. Network connection interface 3011 may be configured to include a receiver and a transmitter interface used to communicate with one or more other devices over a communication network according to one or more communication protocols, such as Ethernet, TCP/IP, SONET, ATM, or the like. Network connection interface 3011 may implement receiver and transmitter functionality appropriate to the communication network links (e.g., optical, electrical, and the like). The transmitter and receiver functions may share circuit components, software or firmware, or alternatively may be implemented separately.

RAM 3017 may be configured to interface via bus 3002 to processing circuitry 3001 to provide storage or caching of data or computer instructions during the execution of software programs such as the operating system, application programs, and device drivers. ROM 3019 may be configured to provide computer instructions or data to processing circuitry 3001. For example, ROM 3019 may be configured to store invariant low-level system code or data for basic system functions such as basic input and output (I/O), startup, or reception of keystrokes from a keyboard that are stored in a non-volatile memory. Storage medium 3021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 3021 may be configured to include operating system 3023, application program 3025 such as a web browser application, a widget or gadget engine or another application, and data file 3027. Storage medium 3021 may store, for use by UE 3000, any of a variety of various operating systems or combinations of operating systems.

Storage medium 3021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 3021 may allow UE 3000 to access computer-executable instructions, application programs or the like, stored on transitory or non-transitory memory media, to off-load data, or to upload data. An article of manufacture, such as one utilizing a communication system may be tangibly embodied in storage medium 3021, which may comprise a device readable medium.

In FIG. 30, processing circuitry 3001 may be configured to communicate with network 3043*b* using communication subsystem 3031. Network 3043*a* and network 3043*b* may be the same network or networks or different network or networks. Communication subsystem 3031 may be configured to include one or more transceivers used to communicate with network 3043*b*. For example, communication subsystem 3031 may be configured to include one or more transceivers used to communicate with one or more remote transceivers of another device capable of wireless communication such as another WD, UE, or base station of a radio access network (RAN) according to one or more communication protocols, such as IEEE 802.30, CDMA, WCDMA, GSM, LTE, UTRAN, WiMax, or the like. Each transceiver may include transmitter 3033 and/or receiver 3035 to implement transmitter or receiver functionality, respectively, appropriate to the RAN links (e.g., frequency allocations and the like). Further, transmitter 3033 and receiver 3035 of each transceiver may share circuit components, software or firmware, or alternatively may be implemented separately.

In the illustrated embodiment, the communication functions of communication subsystem 3031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 3031 may include cellular communication, Wi-Fi communication, Bluetooth communication, and GPS communication. Network 3043*b* may encompass wired and/or wireless networks such as a local-area network (LAN), a wide-area network (WAN), a computer network, a wireless network, a telecommunications network, another like network or any combination thereof. For example, network 3043*b* may be a cellular network, a Wi-Fi network, and/or a near-field network. Power source 3013 may be configured to provide alternating current (AC) or direct current (DC) power to components of UE 3000.

The features, benefits and/or functions described herein may be implemented in one of the components of UE 3000 or partitioned across multiple components of UE 3000. Further, the features, benefits, and/or functions described herein may be implemented in any combination of hardware, software or firmware. In one example, communication subsystem 3031 may be configured to include any of the components described herein. Further, processing circuitry 3001 may be configured to communicate with any of such components over bus 3002. In another example, any of such components may be represented by program instructions stored in memory that when executed by processing circuitry 3001 perform the corresponding functions described herein. In another example, the functionality of any of such components may be partitioned between processing circuitry 3001 and communication subsystem 3031. In another example, the non-computationally intensive functions of any of such components may be implemented in software or firmware and the computationally intensive functions may be implemented in hardware.

Figure 31:
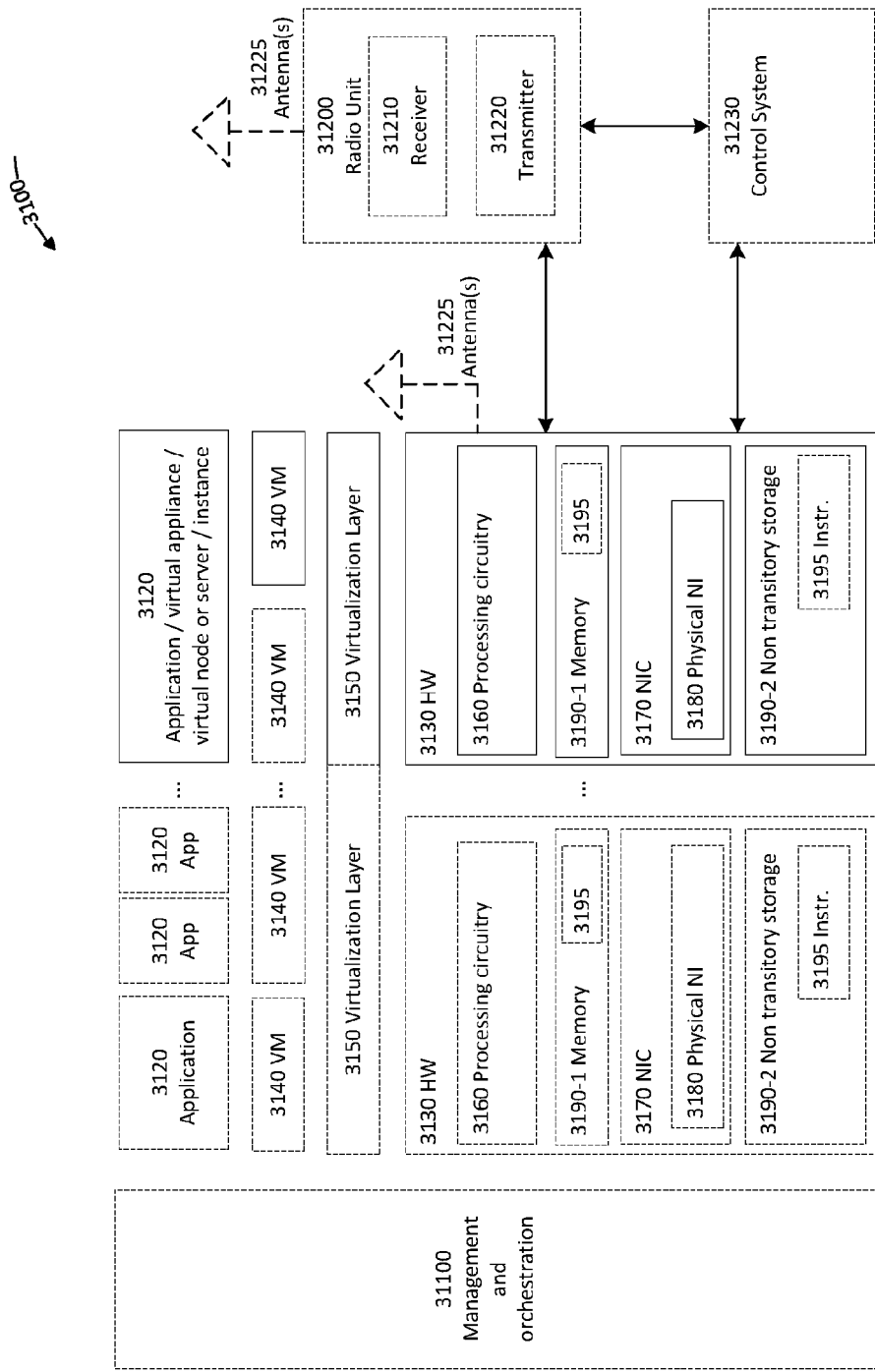
FIG. 31 is a block diagram of a virtualization environment according to some embodiments.

FIG. 31 is a schematic block diagram illustrating a virtualization environment 3100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 3100 hosted by one or more of hardware nodes 3130. Further, in embodiments in which the virtual node is not a radio access node or does not require radio connectivity (e.g., a core network node), then the network node may be entirely virtualized.

The functions may be implemented by one or more applications 3120 (which may alternatively be called software instances, virtual appliances, network functions, virtual nodes, virtual network functions, etc.) operative to implement some of the features, functions, and/or benefits of some of the embodiments disclosed herein. Applications 3120 are run in virtualization environment 3100 which provides hardware 3130 comprising processing circuitry 3160 and memory 3190. Memory 3190 contains instructions 3195 executable by processing circuitry 3160 whereby application 3120 is operative to provide one or more of the features, benefits, and/or functions disclosed herein.

Virtualization environment 3100, comprises general-purpose or special-purpose network hardware devices 3130 comprising a set of one or more processors or processing circuitry 3160, which may be commercial off-the-shelf (COTS) processors, dedicated Application Specific Integrated Circuits (ASICs), or any other type of processing circuitry including digital or analog hardware components or special purpose processors. Each hardware device may comprise memory 3190-1 which may be non-persistent memory for temporarily storing instructions 3195 or software executed by processing circuitry 3160. Each hardware device may comprise one or more network interface controllers (NICs) 3170, also known as network interface cards, which include physical network interface 3180. Each hardware device may also include non-transitory, persistent, machine-readable storage media 3190-2 having stored therein software 3195 and/or instructions executable by processing circuitry 3160. Software 3195 may include any type of software including software for instantiating one or more virtualization layers 3150 (also referred to as hypervisors), software to execute virtual machines 3140 as well as software allowing it to execute functions, features and/or benefits described in relation with some embodiments described herein.

Virtual machines 3140, comprise virtual processing, virtual memory, virtual networking or interface and virtual storage, and may be run by a corresponding virtualization layer 3150 or hypervisor. Different embodiments of the instance of virtual appliance 3120 may be implemented on one or more of virtual machines 3140, and the implementations may be made in different ways.

During operation, processing circuitry 3160 executes software 3195 to instantiate the hypervisor or virtualization layer 3150, which may sometimes be referred to as a virtual machine monitor (VMM). Virtualization layer 3150 may present a virtual operating platform that appears like networking hardware to virtual machine 3140.

As shown in FIG. 31, hardware 3130 may be a standalone network node with generic or specific components. Hardware 3130 may comprise antenna 31225 and may implement some functions via virtualization. Alternatively, hardware 3130 may be part of a larger cluster of hardware (e.g. such as in a data center or customer premise equipment (CPE)) where many hardware nodes work together and are managed via management and orchestration (MANO) 31100, which, among others, oversees lifecycle management of applications 3120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 3140 may be a software implementation of a physical machine that runs programs as if they were executing on a physical, non-virtualized machine. Each of virtual machines 3140, and that part of hardware 3130 that executes that virtual machine, be it hardware dedicated to that virtual machine and/or hardware shared by that virtual machine with others of the virtual machines 3140, forms a separate virtual network elements (VNE).

Still in the context of NFV, Virtual Network Function (VNF) is responsible for handling specific network functions that run in one or more virtual machines 3140 on top of hardware networking infrastructure 3130 and corresponds to application 3120 in FIG. 31.

In some embodiments, one or more radio units 31200 that each include one or more transmitters 31220 and one or more receivers 31210 may be coupled to one or more antennas 31225. Radio units 31200 may communicate directly with hardware nodes 3130 via one or more appropriate network interfaces and may be used in combination with the virtual components to provide a virtual node with radio capabilities, such as a radio access node or a base station.

In some embodiments, some signalling can be effected with the use of control system 31230 which may alternatively be used for communication between the hardware nodes 3130 and radio units 31200.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by radio network equipment, the method comprising:

transmitting, to a radio network equipment central unit, a message that indicates an update to a transport layer address of a radio network equipment distributed unit from an old transport layer address to a new transport layer address, wherein the message indicates the old transport layer address and indicates the new transport layer address.

2. The method of claim 1, wherein multiple user plane bearers or transport layer tunnels are each associated with the old transport layer address, and wherein a transport layer address associated with each of the multiple user plane bearers or transport layer tunnels is to be updated from the old transport layer address to the new transport layer address.

3. The method of claim 2, wherein at least some of the multiple user plane bearers are associated with different wireless devices.

4. The method of claim 1, wherein the message indicates that, for each of multiple user plane bearers associated with the radio network equipment distributed unit, a transport layer address of a transport layer tunnel endpoint of the user plane bearer is to be changed from the old transport layer address to the new transport layer address.

5. The method of claim 4, wherein the message indicates, for each of the multiple user plane bearers associated with the radio network equipment distributed unit, an update to transport layer information for the transport layer tunnel endpoint of the user plane bearer from old transport layer information to new transport layer information, wherein the message includes the old transport layer information and includes the new transport layer information, wherein the old transport layer information includes the old transport layer address and the new transport layer information includes the new transport layer address.

6. The method of claim 5, wherein the old transport layer information further includes an old tunnel endpoint identity (TEID), and wherein the new transport layer information further includes a new TEID.

7. The method of claim 4, wherein a transport layer tunnel endpoint is an endpoint of an F1-U tunnel or a GTP-U tunnel.

8. The method of claim 1, wherein the message is a F1 application part (AP) protocol message.

9. The method of claim 1, wherein the message includes the old transport layer address and the new transport layer address.

10. A method performed by a radio network equipment central unit, the method comprising:
receiving a message that indicates an update to a transport layer address of a radio network equipment distributed unit from an old transport layer address to a new transport layer address, wherein the message indicates the old transport layer address and indicates the new transport layer address.

11. The method of claim 10, further comprising changing a transport layer address of a transport layer tunnel endpoint of a user plane bearer associated with the radio network equipment distributed unit from the old transport layer address to the new transport layer address.

12. The method of claim 10, wherein multiple user plane bearers or transport layer tunnels are each associated with the old transport layer address, and wherein the method further comprises, for each of the multiple user plane bearers or transport layer tunnels, updating a transport layer address associated with the user plane bearer or transport layer tunnel from the old transport layer address to the new transport layer address.

13. The method of claim 12, wherein at least some of the multiple user plane bearers are associated with different wireless devices.

14. The method of claim 10, wherein the message indicates, for each of multiple user plane bearers associated with the radio network equipment distributed unit, an update to transport layer information for a transport layer tunnel endpoint of the user plane bearer from old transport layer information to new transport layer information, wherein the message includes the old transport layer information and includes the new transport layer information, wherein the old transport layer information includes the old transport layer address and the new transport layer information includes the new transport layer address.

15. The method of claim 14, wherein the old transport layer information further includes an old tunnel endpoint identity (TEID), and wherein the new transport layer information further includes a new TEID.

16. The method of claim 14, wherein a transport layer tunnel endpoint is an endpoint of an F1-U tunnel or a GTP-U tunnel.

17. The method of claim 10, wherein the message is a F1 application part (AP) protocol message.

18. A method performed by a radio network equipment central unit, the method comprising:
assigning a new transport layer address to a radio network equipment distributed unit; and
responsive to said assigning, for each of multiple user plane bearers associated with the radio network equipment distributed unit, changing a transport layer address of a transport layer tunnel endpoint of the user plane bearer to the new transport layer address.

19. The method of claim 18, wherein the radio network equipment distributed unit is a distributed unit of an integrated access backhaul (IAB) node, and wherein the radio network equipment central unit is a central unit of an IAB donor node.

20. The method of claim 19, wherein said assigning is performed responsive to, or as part of a procedure for, a change in a parent IAB node of the IAB node or an IAB donor node of the IAB node.

21. The method of claim 18, wherein the radio network equipment distributed unit is a distributed unit of radio network equipment and the radio network equipment central unit is a central unit of the same radio network equipment.

\* \* \* \* \*